United States Patent
Kim et al.

(10) Patent No.: US 10,528,829 B2
(45) Date of Patent: Jan. 7, 2020

(54) APPARATUS FOR PARKING VEHICLE AND VEHICLE

(71) Applicant: LG ELECTRONICS INC., Seoul (KR)

(72) Inventors: Ilho Kim, Seoul (KR); Nami Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 233 days.

(21) Appl. No.: 15/345,906

(22) Filed: Nov. 8, 2016

(65) Prior Publication Data

US 2017/0132482 A1    May 11, 2017

(30) Foreign Application Priority Data

Nov. 9, 2015    (KR) .......................... 10-2015-0156696

(51) Int. Cl.
*G06T 7/00* (2017.01)
*G06K 9/00* (2006.01)
(Continued)

(52) U.S. Cl.
CPC .......... *G06K 9/00812* (2013.01); *B60K 35/00* (2013.01); *B60R 1/00* (2013.01);
(Continued)

(58) Field of Classification Search
CPC .................. G06K 9/00812; B60R 1/00; B60R 2300/105; B60R 2300/806; G06F 3/0486;
(Continued)

(56) References Cited

U.S. PATENT DOCUMENTS

| 2008/0136673 A1* | 6/2008 | Jung ................. | B62D 15/0285 340/932.2 |
| 2014/0121883 A1* | 5/2014 | Shen ................. | B62D 15/0285 701/28 |

(Continued)

FOREIGN PATENT DOCUMENTS

| CN | 103366601 | 10/2013 |
| CN | 103777882 | 5/2014 |

(Continued)

OTHER PUBLICATIONS

Extended European Search Report in European Application No. 16197767.3, dated Mar. 27, 2017, 8 pages (with English translation).

(Continued)

*Primary Examiner* — Howard D Brown, Jr.
(74) *Attorney, Agent, or Firm* — Fish & Richardson P.C.

(57) ABSTRACT

An apparatus configured to park a vehicle includes a plurality of cameras configured to acquire images of surroundings of the vehicle; a display configured to display an around-view image showing a view around the vehicle that is generated by combining the images acquired by the plurality of cameras; and a processor. The processor is configured to determine a first input that is applied on the around-view image displayed on the display; display, according to the first input that has been applied on the around-view image, a parking guide image representing a user-specified parking region for the vehicle; determine whether there is an actual parking region that matches the displayed parking guide image representing the user-specified parking region; and based on a determination that there is an actual parking region that matches the displayed parking guide image, provide a signal that controls a parking operation of the vehicle.

19 Claims, 29 Drawing Sheets

(51) Int. Cl.
| | |
|---|---|
| *B60K 35/00* | (2006.01) |
| *G06F 3/0488* | (2013.01) |
| *G06F 3/0486* | (2013.01) |
| *B60R 1/00* | (2006.01) |
| *G06T 7/73* | (2017.01) |
| *G06T 7/246* | (2017.01) |
| *G08G 1/16* | (2006.01) |
| *B62D 15/02* | (2006.01) |

(52) U.S. Cl.
CPC ....... *B62D 15/0285* (2013.01); *G06F 3/0486* (2013.01); *G06F 3/0488* (2013.01); *G06T 7/246* (2017.01); *G06T 7/73* (2017.01); *G08G 1/168* (2013.01); *B60K 2370/1438* (2019.05); *B60K 2370/52* (2019.05); *B60R 2300/105* (2013.01); *B60R 2300/806* (2013.01); *G06T 2207/10016* (2013.01); *G06T 2207/30264* (2013.01)

(58) Field of Classification Search
CPC .. G06F 3/0488; B62D 15/0285; G08G 1/168; B60K 2350/352; B60K 2350/1028; B60K 35/00; G06T 2207/10016; G06T 7/73; G06T 7/246; G06T 2207/30264
See application file for complete search history.

(56) References Cited

U.S. PATENT DOCUMENTS

| | | | | |
|---|---|---|---|---|
| 2014/0160275 | A1* | 6/2014 | Sakakibara | B62D 15/029 348/118 |
| 2015/0039173 | A1* | 2/2015 | Beaurepaire | B60W 30/06 701/23 |
| 2016/0300113 | A1* | 10/2016 | Molin | G06T 7/80 |
| 2017/0120817 | A1* | 5/2017 | Kuehnle | B60R 1/00 |

FOREIGN PATENT DOCUMENTS

| | | |
|---|---|---|
| CN | 104228682 | 12/2014 |
| DE | 102014001555 4 | 8/2015 |
| EP | 2481637 | 8/2012 |
| JP | 2004068420 A | 3/2004 |
| JP | 2005-239048 | 9/2005 |
| JP | 2006224778 | 8/2006 |
| JP | 3861285 | 12/2006 |
| JP | 2008009913 | 1/2008 |
| JP | 2010202071 | 9/2010 |
| JP | 2013216307 | 10/2013 |
| JP | 2014065342 | 4/2014 |
| JP | 2014141216 | 8/2014 |
| JP | 2014170551 | 9/2014 |
| JP | 2014-193662 | 10/2014 |
| KR | 10-2011-0134025 | 12/2011 |
| KR | 10-2012-0066194 | 6/2012 |
| KR | 101211374 | 12/2012 |
| KR | 10-2013-0128987 | 11/2013 |
| KR | 10-2014-0094116 | 7/2014 |

OTHER PUBLICATIONS

European Search Report in European Application No. 18176029.9, dated Sep. 25, 2018, 10 pages.

Office Action in Chinese Application No. 201611020302.0, dated Sep. 25, 2018, 16 pages (with English Translation).

European Office Action in European Application No. 18176029.9, dated May 24, 2019, 7 pages.

* cited by examiner

APPARATUS FOR PARKING VEHICLE AND VEHICLE

CROSS-REFERENCE TO RELATED APPLICATION

This application claims an earlier filing date and right of priority to Korean Patent Application No. 10-2015-0156696, filed on Nov. 9, 2015 in the Korean Intellectual Property Office, the contents of which is incorporated herein by reference in its entirety.

TECHNICAL FIELD

The present disclosure relates to an apparatus for parking a vehicle.

BACKGROUND

A vehicle is a machine moved by a user who rides therein. An example of a vehicle is a car.

For convenience of vehicle users, some vehicles include various sensors and electronic devices. For example, some vehicles include various devices that improve driving convenience of users.

With recent growing interest in self-driving cars, sensors installed in self-driving cars are being actively studied. Sensors installed in self-driving cars include cameras, infrared sensors, radar, GPS, lidar, gyroscopes and the like. Among such sensors, the camera plays an important role as a sensor for providing various types of information.

SUMMARY

Systems and techniques are disclosed herein that enable automated parking functionality for a vehicle.

In one aspect, an apparatus configured to park a vehicle includes a plurality of cameras configured to acquire images of surroundings of the vehicle; a display configured to display an around-view image showing a view around the vehicle that is generated by combining the images acquired by the plurality of cameras; and a processor. The processor is configured to determine a first input that is applied on the around-view image displayed on the display; display, according to the first input that has been applied on the around-view image, a parking guide image representing a user-specified parking region for the vehicle; determine whether there is an actual parking region that matches the displayed parking guide image representing the user-specified parking region; and based on a determination that there is an actual parking region that matches the displayed parking guide image, provide a signal that controls a parking operation of the vehicle.

In some implementations, the first input is a touch-and-drag input received through the display while the around-view image is displayed.

In some implementations, the touch-and-drag input includes a drag input starting from a touched first point on the around-view image and extending to a second point having a horizontal axis and a vertical axis that are different from the first point. The parking guide image has a rectangular shape and includes a diagonal line connecting the first point and the second point.

In some implementations, the processor is configured to provide the signal that controls the parking operation the vehicle such that a front side of the vehicle is parked at a location corresponding to the first point of the touch-and-drag input and a rear side of the vehicle is parked at a location corresponding to the second point of the touch-and-drag input.

In some implementations, the processor is further configured to determine that a second input is applied on the around-view image displayed on the display; and based on the second input is applied on the around-view image, control a position, a size, a direction, or a shape of the parking guide image displayed on the around view image.

In some implementations, the processor is further configured to, based on the determination that there is an actual parking region that matches the displayed parking guide image, control a parking availability notice to be output through the display.

In some implementations, the processor is further configured to, based on a determination that there is not an actual parking region that matches the displayed parking guide image, control a parking unavailability notice to be output.

In some implementations, the processor is further configured to, based on the determination that there is not an actual parking region that matches the displayed parking guide image, control a recommended parking space to be displayed on the display.

In some implementations, the processor is configured to control the recommended parking space to be displayed on the display by determining at least one available parking space; determining, from among the at least one available parking space, a parking space having a largest region overlapping with the parking guide image; and displaying the parking space having the largest region overlapping with the parking guide image as the recommended parking space.

In some implementations, the processor is further configured to determine that a third input is applied to the display; and based on the determination that the third input has been applied, provide the signal that controls the parking operation of the vehicle such that the vehicle is parked in the recommended parking space.

In some implementations, the processor is further configured to determine that the first input is a long touch input received through the display while the around-view image is displayed; determine a duration of the long touch input; and control a size of the parking guide image to be changed in proportion to the duration of the long touch input.

In some implementations, the processor is configured to determine the first input by determining a position and a posture of a mobile terminal that is in contact with or in proximity to the display while the around view image is displayed; and determining the first input based on the position and the posture of the mobile terminal.

In some implementations, the apparatus further includes a communication unit configured to exchange data with the mobile terminal. The processor is further configured to receive information regarding the position and the posture of the mobile terminal through the communication unit; and control the parking guide image to be displayed on the display according to the information regarding the position and the posture of the mobile terminal.

In some implementations, the processor is configured to control the displayed parking guide image to be changed according to a change in at least one of the position or the posture of the mobile terminal.

In some implementations, the processor is configured to determine a recommended parking space according to at least one of a parking history, a detected surrounding environment, or a detected object; and control the display to display, on the around-view image, the recommended parking space.

In some implementations, the processor is further configured to detect at least one object located near the parking region; determine at least one distance between the at least one object and an estimated parked state of the vehicle in the parking region; and control the display to display an indication of the at least one distance between the at least one object and the estimated parking state of the vehicle in the parking region.

In some implementations, the processor is configured to provide the signal that controls the parking operation of the vehicle such that a distance between the at least one object and a driver-side door of the vehicle exceeds a threshold.

In some implementations, the processor is further configured to detect a change in a surrounding environment of the vehicle while the vehicle is in a parked state; and based on the detection of the change in the surrounding environment while the vehicle is in the parked state, provide a second signal that controls the vehicle to move and perform a second parking operation based on the change in the surrounding environment.

In some implementations, the processor is configured to detect the change in the surrounding environment by detecting a change in a rainfall, a snowfall, or an intensity of sunlight radiated on the vehicle.

In some implementations, the processor is further configured to determine that a second parking region is available while the vehicle is in a parked state; and based on the determination that the second parking region is available while the vehicle is in a parked state, provide a second signal controls the vehicle to move and perform a second parking operation into the second parking region.

All or part of the features described throughout this application may be implemented as a computer program product including instructions that are stored on one or more non-transitory machine-readable storage media, and that are executable on one or more processing devices. All or part of the features described throughout this application may be implemented as an apparatus, method, or electronic system that may include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

An apparatus for parking a vehicle is described that provides automatic parking functionality with enhanced user control and convenience. Implementations described herein enable a driver to select a desired parking space and control the vehicle to automatically park in the desired parking space. In some implementations, the system enables a user to park a vehicle according to a desired position and direction, or to park the vehicle safely away from surrounding objects, or to park the vehicle according to a surrounding environment of the vehicle, such as sunlight or snow.

As such, in some implementations, an apparatus for parking a vehicle enables an accurate interface between the vehicle and a user. The apparatus may provide functionality for the user to select and use various parking methods or parking forms according to situation in addition to a set parking method. In some implementations, the parking apparatus may provide functionality for a user to park a vehicle according to user input even when a parking line is not present.

In addition to automated parking of a vehicle, the apparatus may also automatically change the parking location of a vehicle that has already been parked. For example, the apparatus may move a parked vehicle and re-park the vehicle according to a change in the environment of the vehicle.

A vehicle as described in this disclosure may include a car or a motorcycle, but implementations are not necessarily limited thereto, and may generally include any suitable vehicle that transports people. Hereinafter the description will be based on a car.

The vehicle described in this disclosure may include an internal combustion engine vehicle having an engine as a power source, a hybrid vehicle having an engine, an electric motor as a power source and an electric vehicle having an electric motor as a power source, or generally a vehicle that is motorized by any suitable power source.

In the following description, the left side of a vehicle refers to the left side in a driving direction of the vehicle and the right side of the vehicle refers to the right side in the driving direction of the vehicle.

Figure 1:
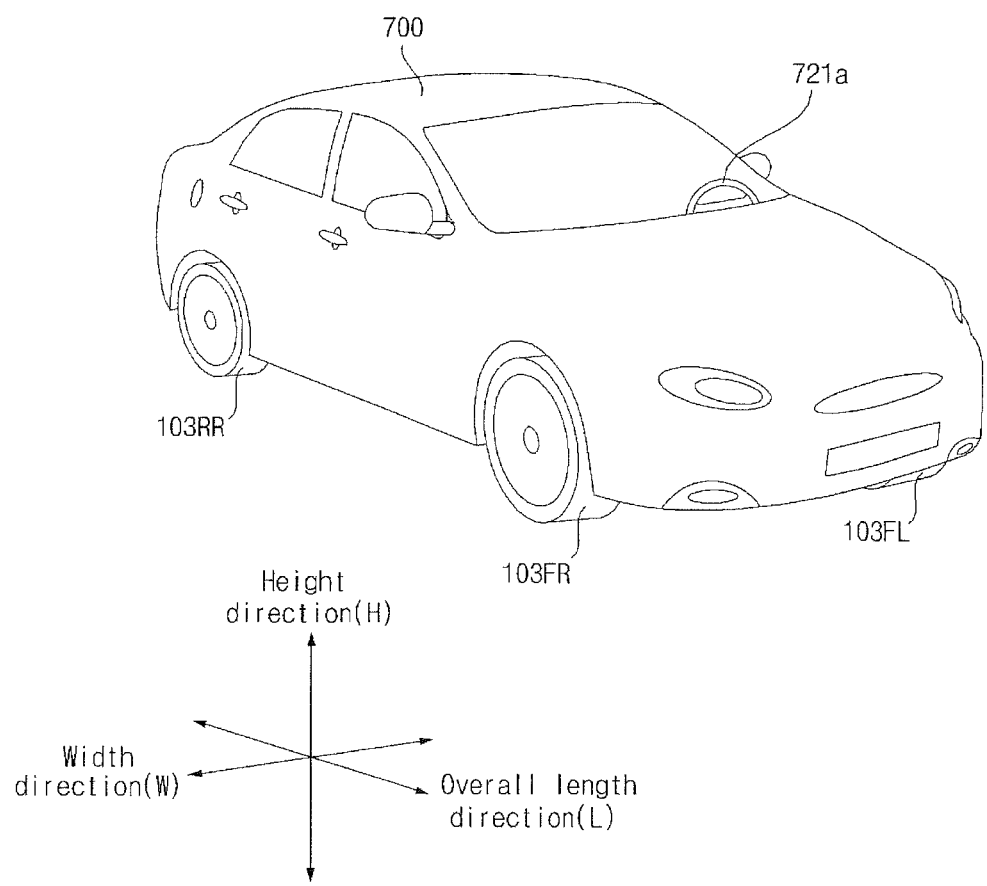
FIG. 1 is a diagram illustrating an example of an exterior of a vehicle.

FIG. 1 shows the exterior of a vehicle according to an implementation.

Referring to FIG. 1, a vehicle 700 may include wheels 103FR, 103FL and 103RR rotating by a power source, a steering unit 721a for steering the vehicle 700 and a plurality of cameras attached to the vehicle 700.

The plurality of cameras may acquire images of surroundings of the vehicle, captured at positions at which the cameras are respectively disposed. The images acquired by the cameras may be processed in an apparatus for parking a vehicle.

The plurality of cameras may include two or more cameras. While four cameras are described in the following, the present disclosure is not limited to the number of cameras.

According to an implementation, the cameras may include two, three, four or more cameras.

Figure 2A:
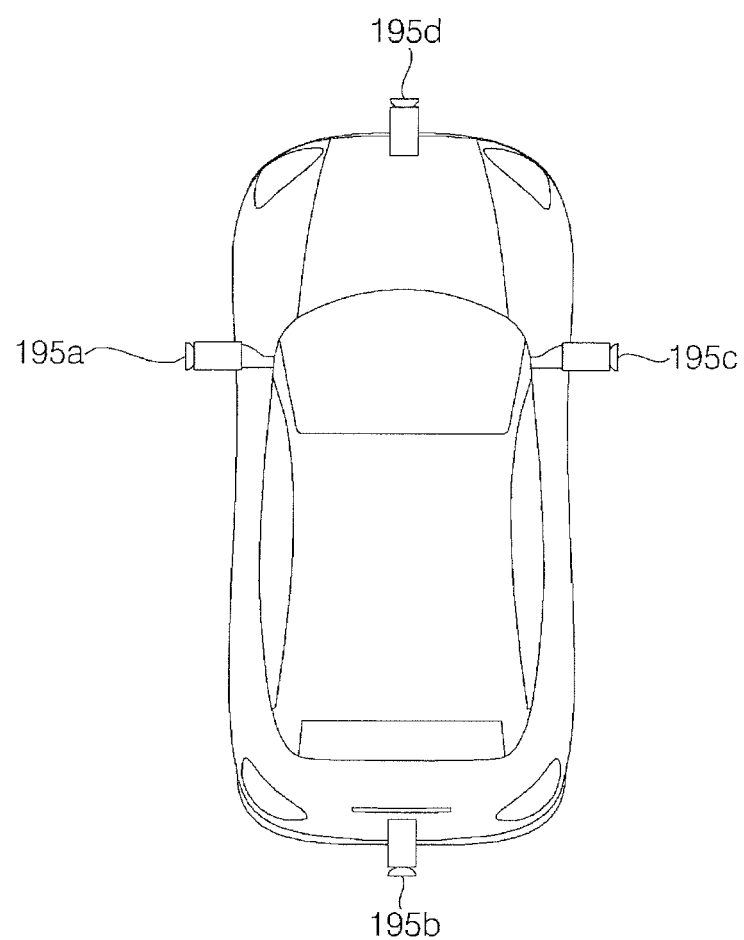
FIG. 2A is a diagram illustrating an example of positions of a plurality of cameras.

FIG. 2A illustrates the positions of the plurality of cameras according to an implementation.

Referring to FIG. 2A, the plurality of cameras 195a, 195b, 195c and 195d may be respectively arranged at the left, rear, right and front sides of the vehicle.

Particularly, the left camera 195a and the right camera 195c may be respectively provided inside of a case enveloping a left side mirror and inside of a case enveloping a right side mirror.

The rear camera 195b and the front camera 195 may be respectively positioned near a trunk switch and at an emblem or near the emblem.

Images respectively obtained by the cameras 195a, 195b, 195c and 195d may be sent to a processor (170 of FIG. 4A or 4B) included in the vehicle 700. The processor (170 of FIG. 4A or 4B) may generate an around-view image by combining the images. The around-view image may represent a view of a surroundings of the vehicle.

Figure 2B:
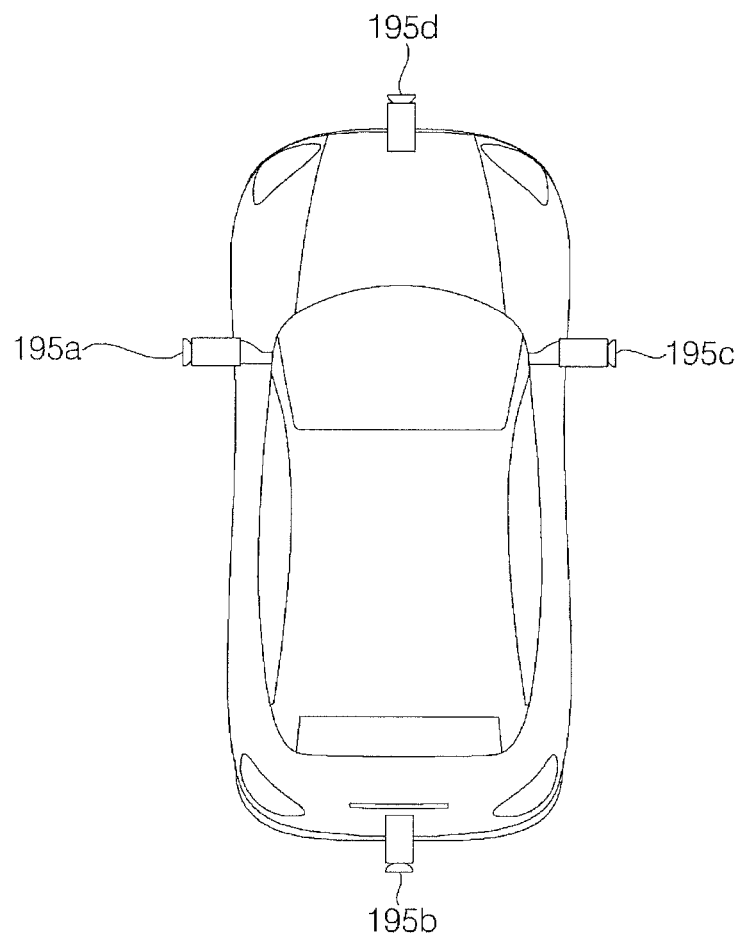
FIG. 2B is a diagram illustrating an example of an around-view image.

FIG. 2B is a view for explaining an around view image according to an implementation.

An around view image 201 may include a first image region 195ai from the left camera 195a, a second image region 195bi from the rear camera 195b, a third image region 195ci from the right camera 195c and a fourth image region 195di from the front camera 195d.

When an around view image is generated by combining a plurality of images, a boundary between image regions is generated. Such a boundary may be naturally represented by being processed through image blending.

Boundary lines 202a, 202b, 202c and 202d may be indicated at boundaries of the plurality of image regions.

Figure 3A:
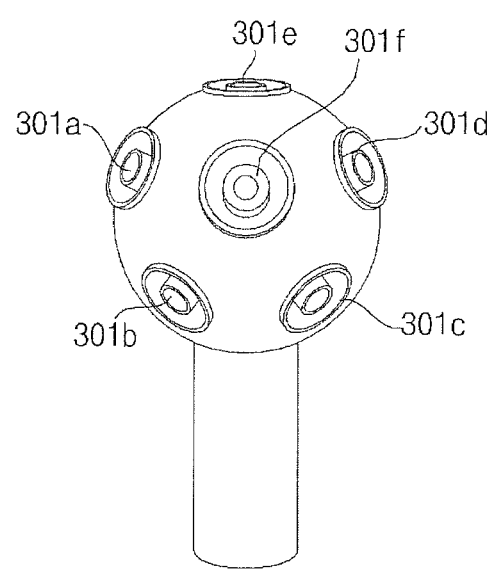
FIGS. 3A, 3B, and 3C are diagrams illustrating examples of camera modules.
Figure 3B:
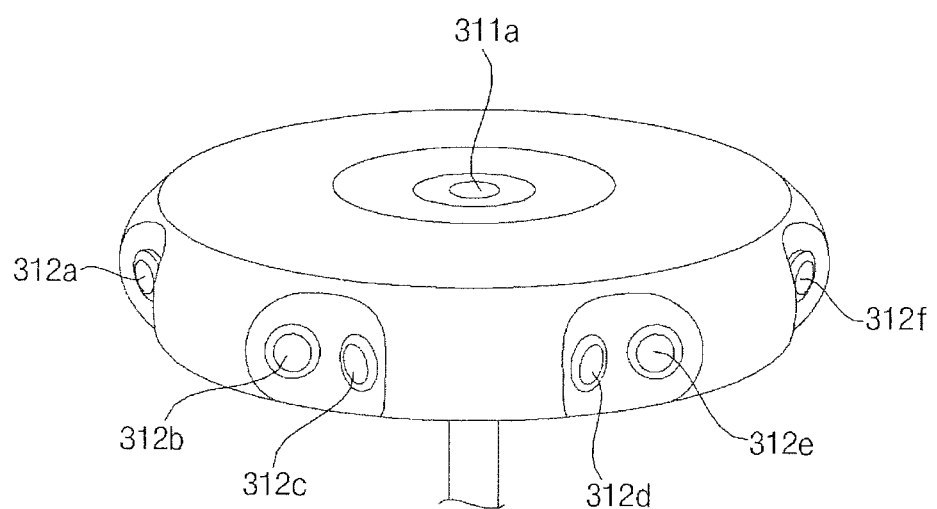
Figure 3C:
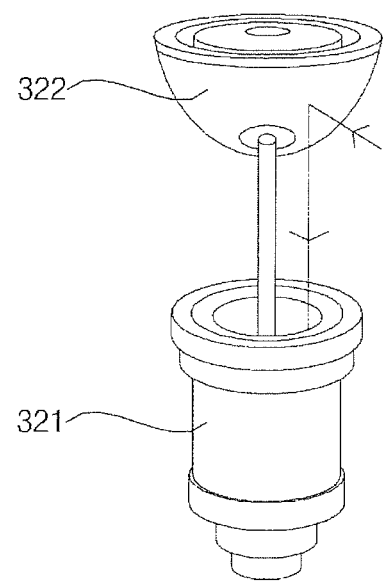

FIGS. 3A to 3C illustrate camera modules according to various implementations.

FIG. 3A illustrates an omnidirectional camera module 195 according to a first implementation.

Referring to FIG. 3A, the omnidirectional camera module 195 may include a plurality of cameras 301a, 301b, 301c, 301d, 301e and 301f. Each of the cameras 301a, 301b, 301c, 301d, 301e and 301f may include an image sensor (e.g., CCD or CMOS) and a lens. The cameras 301a, 301b, 301c, 301d, 301e and 301f may acquire images in multiple directions. The acquired images may be sent to the processor 170 and combined by the processor 170.

When the omnidirectional camera module 195 is provided to the vehicle 700, an omnidirectional image with respect to the vehicle 700 may be obtained through the cameras 301a, 301b, 301c, 301d, 301e and 301f. For example, the omnidirectional camera module 195 may acquire images of a front view, a rear view, a left view, a right view, a bottom view and a top view of the vehicle 700.

The number and positions of the cameras 301a, 301b, 301c, 301d, 301e and 301f may be appropriately determined such that an omnidirectional image may be acquired. The cameras 301a, 301b, 301c, 301d, 301e and 301f may have appropriate viewing angles such that images acquired by neighboring cameras may overlap.

The processor 170 may combine all images acquired by the cameras 301a, 301b, 301c, 301d, 301e and 301f on the basis of predetermined features detected from overlapping portions of the acquired images. For example, the processor 170 may detect a common feature from an overlapping portion of a first image acquired by the first camera 301a and a second image acquired by the second camera 301b. The processor 170 may combine the first image and the second image on the basis of the detected feature. In this manner, the processor 170 may generate an omnidirectional image by combining a plurality of images received from the plurality of cameras 301a, 301b, 301c, 301d, 301e and 301f.

FIG. 3B illustrates an omnidirectional camera module 195 according to a second implementation.

Referring to FIG. 3B, the omnidirectional camera module 195 may include a plurality of cameras 311a, 312a, 312b, 312c, 312d, 312e and 312f. Each of the cameras 311a, 312a, 312b, 312c, 312d, 312e and 312f may include an image sensor (e.g., CCD or CMOS) and a lens. The cameras 311a, 312a, 312b, 312c, 312d, 312e and 312f may acquire images in multiple directions. The acquired images may be sent to the processor 170 and combined by the processor 170.

When the omnidirectional camera module 195 is provided to the vehicle 700, an omnidirectional image with respect to the vehicle 700 may be obtained through the cameras 311a, 312a, 312b, 312c, 312d, 312e and 312f.

For example, the first camera 311a from among the plurality of cameras 311a, 312a, 312b, 312c, 312d, 312e and 312f may acquire an image of a top view of the vehicle 700. In this case, it is desirable that the first camera 311a be a wide-angle camera. Cameras 312a, 312b, 312c, 312d, 312e and 312f other than the first camera 311a may acquire images of side views and a bottom view of the vehicle 700.

The image acquired by the first camera 311a may partially overlap with the images acquired by the other cameras 312a, 312b, 312c, 312d, 312e and 312f. The processor 170 may combine the images on the basis of features detected from the overlapping portions.

In addition, the images acquired by the cameras 312a, 312b, 312c, 312d, 312e and 312f other than the first camera 311a may partially overlap. The processor 170 may combine the images on the basis of features detected from the overlapping portions.

The processor 170 may generate an omnidirectional image by combining a plurality of images received from the plurality of cameras 311a, 312a, 312b, 312c, 312d, 312e and 312f.

FIG. 3C illustrates an omnidirectional camera module 195 according to a third implementation.

Referring to FIG. 3C, the omnidirectional camera module 195 may include a camera 321 and a parabolic mirror 322. The camera 321 may include an image sensor (e.g., CCD or CMOS) and a lens.

The camera 321 may acquire an image reflected by the parabolic mirror 322. Here, the image may be an omnidirectional image.

Figure 4A:
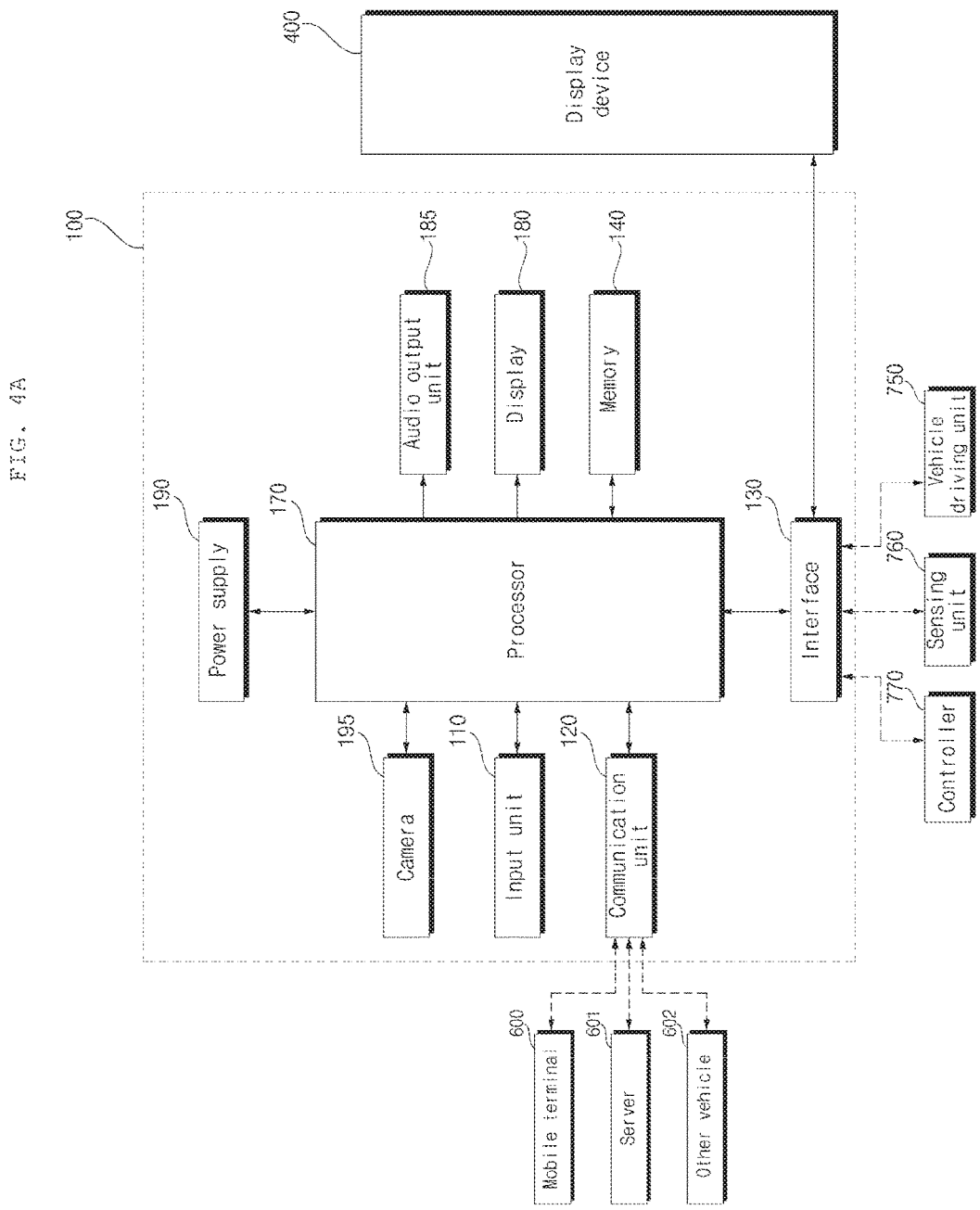
FIGS. 4A and 4B are block diagrams illustrating examples of an apparatus for parking a vehicle.
Figure 4B:
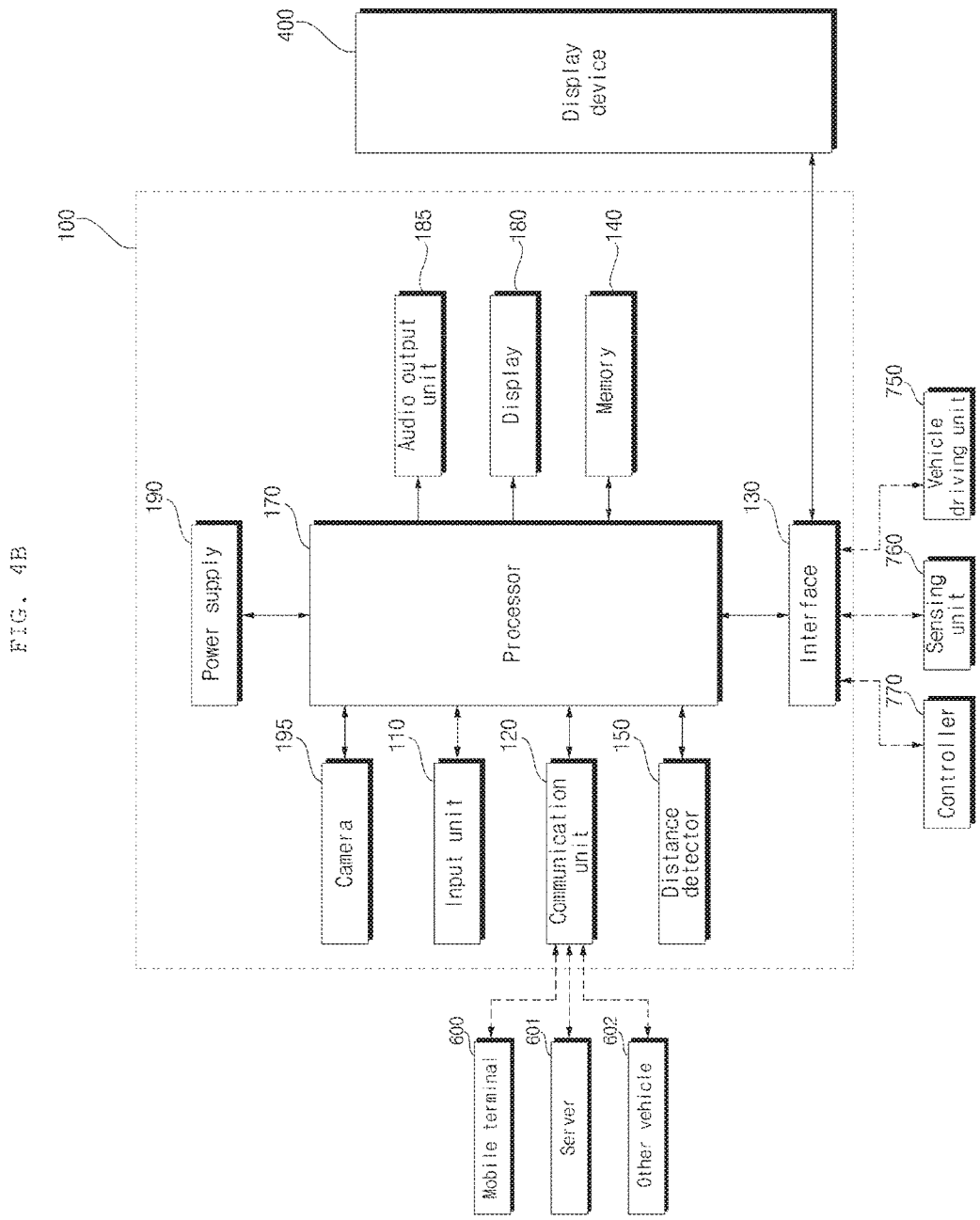

FIGS. 4A and 4B are block diagrams of an apparatus for parking a vehicle according to some implementations.

Apparatuses 100 for parking a vehicle may generate an around view image by combining a plurality of images received from the plurality of cameras 195.

Referring to FIG. 4A, the apparatus 100 for parking a vehicle may include an input unit 110, a communication unit 120, an interface 130, a memory 140, the processor 170, a display 180, an audio output unit 185, a power supply unit 190 and the cameras 195.

The input unit 110 may include a plurality of buttons or a touchscreen. The apparatus 100 for parking a vehicle may be powered on to operate through the plurality of buttons or the touchscreen. In addition, various input operations may be performed through the input unit 110.

The communication unit 120 may exchange data with a mobile terminal 600, a server 601 or another vehicle 602. Particularly, the communication unit 120 may exchange data with a mobile terminal of a driver of the vehicle through a wireless communication scheme. Various data communication schemes such as Bluetooth, Wi-Fi Direct, Wi-Fi, APiX and NFC may be used as the wireless communication scheme.

The communication unit 120 may receive weather information and traffic information, for example, TPEG (Transport Protocol Expert Group) information from the mobile terminal 600 or the server 601. The apparatus 100 for parking a vehicle may transmit real-time information obtained thereby to the mobile terminal 600 or the server 601.

When the user gets in the vehicle, the mobile terminal 600 of the user and the apparatus 100 for parking a vehicle may be paired automatically or according to execution of an application by the user.

The communication unit 120 may receive traffic light change information from the external server 601. Here, the external server 601 may be a server installed in a traffic control center.

The interface 130 may receive vehicle related data or transmit signals processed or generated by the processor 170 to external devices. To this end, the interface 130 may perform data communication with a controller 770, a vehicle display device 400, a sensing unit 760 and a vehicle-driving unit 750 of the vehicle.

The interface 130 may receive navigation information through data communication with the controller 770, the vehicle display device 400 or a separate navigation system. Here, the navigation information may include information on a set destination, route information with respect to the destination, map information related to vehicle driving and current vehicle location information. The navigation information may include information on the location of the vehicle on a road.

The interface 130 may receive sensor information from the controller 770 or the sensing unit 760.

Here, the sensor information may include at least one of vehicle direction information, vehicle location information (GPS information), vehicle angle information, vehicle speed information, vehicle acceleration information, vehicle tilting information, information on forward/backward movement of the vehicle, battery information, fuel information, tire information, vehicle lamp information, vehicle internal temperature information, vehicle internal humidity information and information on rain.

Such sensor information may be acquired from a heading sensor, a yaw sensor, a gyro sensor, a position module, a vehicle front/rear sensor, a wheel sensor, a vehicle speed sensor, a car body tilting sensor, a battery sensor, a fuel sensor, a tire sensor, a steering sensor according to steering wheel rotation, a vehicle internal temperature sensor, a vehicle internal humidity sensor and a rain sensor. The position module may include a GPS module for receiving GPS information.

From among the sensor information, the vehicle direction information, vehicle location information, vehicle angle information, vehicle speed information and vehicle tilting information, which are related to driving of the vehicle, may be referred to as driving information.

The interface 130 may provide a signal to the controller 770 or the vehicle-driving unit 750. Here, the signal may be a control signal. For example, the processor 170 may provide a control signal for acceleration to a power source driver 751 (shown in FIG. 8). For example, the processor 170 may provide a steering control signal to a steering driver 752 (shown in FIG. 8) through the interface 130. For example, the processor 170 may provide a control signal for deceleration to a brake driver 753 (shown in FIG. 8) through the interface 130.

The memory 140 may store data for overall operation of the apparatus 100 for parking a vehicle, such as a processing or control program of the processor 170.

The memory 140 may store data for object identification. For example, the memory 140 may store data for identifying a predetermined object according to a predetermined algorithm when the predetermined object is detected from an image acquired through the cameras 195.

The memory 140 may store data about traffic information. For example, the memory 140 may store data for identifying predetermined traffic information according to a predetermined algorithm when the traffic information is detected from an image acquired by the cameras 195.

The memory 140 may be various storage devices such as a ROM, a RAM, an EPROM, a flash drive and hard drive.

The processor 170 controls the overall operation of each unit included in the apparatus 100 for parking a vehicle.

The processor 170 may process an around view image of the vehicle, acquired by the cameras 195. Particularly, the processor 170 may perform computer vision based signal processing. The processor 170 may perform object detection and object tracking. Particularly, the processor 170 may perform lane detection (LD), vehicle detection (VD), pedestrian detection (PD), brightspot detection (BD), traffic sign recognition (TSR), road surface detection and the like during object detection. The processor 170 may detect information from an around view image of the vehicle, acquired by the cameras 195.

The information may be information about a driving situation of the vehicle. For example, the information may include information about a road on which the vehicle travels, traffic regulation information, information on neighboring vehicles, information on vehicle or pedestrian traffic lights, construction information, traffic condition information, parking lot information, lane information and the like.

The processor 170 may identify the detected information by comparing the detected information with information stored in the memory 140.

The processor 170 may receive weather information and traffic condition information, e.g., TPEG information, through the communication unit 120.

The processor 170 may detect information on traffic conditions around the vehicle, detected on the basis of an image, in real time in the apparatus 100 for parking a vehicle.

The processor 170 may receive navigation information from the vehicle display device 400 or a separate navigation system through the interface 130.

The processor 170 may receive sensor information from the controller 770 or the sensing unit 760 through the interface 130. Here, the sensor information may include at least one of vehicle direction information, vehicle location information (GPS information), vehicle angle information, vehicle speed information, vehicle acceleration information, vehicle tilting information, information on forward/backward movement of the vehicle, battery information, fuel information, tire information, vehicle lamp information, vehicle internal temperature information, vehicle internal humidity information and steering wheel rotation information.

The processor 170 may acquire a plurality of images from the plurality of cameras 195 and generate an around view image by combining the plurality of images. The processor 170 may display the around view image through the display 180.

The processor 170 may display a parking guide image, which represents a user-specified predicted parking region according to user input, on the around view image. Here, the user input may be touch input applied to the around view image displayed through the display 180. For example, the user input may be touch-and-drag input received through the display 180 while the around view image is displayed. Here, the user input may be referred to as first user input to be discriminated from other user inputs.

The touch-and-drag input may include drag input which connects a touched first point on the around view image and a second point located on horizontal and vertical axes different from the first point without releasing the touch applied to the first point. Here, the parking guide image may have a rectangular form having a line connecting the first point and the second point as a diagonal line.

In this case, the processor 170 may provide a signal for controlling the vehicle to be parked such that the front of the vehicle corresponds to the first point and the back of the vehicle corresponds to the second point.

When a rectangular form having a line connecting the first point and the second point as a diagonal line is formed, the processor 170 may recognize the first point and the second point as directions of the front and back of the vehicle, respectively. The processor 170 may provide a signal for controlling the vehicle to be parked in a recognized direction.

According to an implementation, the first user input may be long touch input received through the display 180 while the around view image is displayed on the display 180. The processor 170 may determine that the touch input is a long touch input, for example, by determining that the touch input has been applied at the same point for a duration that exceeds the threshold. The processor 170 may control the parking guide image to be changed in size in proportion to the duration of the long touch input. For example, the processor 170 may change the size of the parking guide image in response to the duration of long touch input while the shape of the parking guide image is preset.

According to an implementation, the first user input may be input using the mobile terminal 600. For example, the first user input may be input depending on the position and posture of the mobile terminal 600 in contact with or in proximity to the display 180 while the around view image is displayed on the display 180.

The processor 170 may receive information about the position and posture of the mobile terminal 600 through the communication unit 120 while the around view image is displayed. The processor 170 may control the parking guide image to be displayed on the display 180 according to the information about the position and posture of the mobile terminal 600.

When the position and posture of the mobile terminal 600 are changed, the processor 170 may control the parking guide image to be changed according to a degree to which the position and posture of the mobile terminal 600 are changed and to be displayed.

The processor 170 may determine whether the parking guide image is matched to a real parking region. When the parking guide image is matched to a real parking region, the processor 170 may provide a signal for parking control. Here, the signal may be provided to the vehicle-driving unit 750.

The processor 170 may receive user input with respect to the parking guide image while the parking guide image is displayed. Here, the user input may be touch input applied to the parking guide image displayed on the display 180. The user input may be referred to as second user input to be discriminated from other user inputs.

The processor 170 may change the size, direction or shape of the parking guide image according to the second user input. In addition, the processor 170 may control the position of the parking guide image displayed on the around view image to be changed.

The processor 170 may determine whether the parking guide image is matched to an available parking space. The processor 170 may determine whether the parking guide image is matched to a detected available parking space. For example, the processor 170 may determine whether the parking guide image is matched to an available parking space detected from the around view image according to whether the sizes and shapes of the parking guide image and the detected available parking space overlap.

When the parking guide image is matched to the available parking space, the processor 170 may output a parking availability notice through the display 180 or the audio output unit 185.

When the parking guide image is not matched to the available parking space, the processor 170 may output a parking unavailability notice through the display 180 or the audio output unit 185. In this case, the processor 170 may display a recommended parking space. The recommended parking space may be a parking space corresponding to a region closest to the parking guide image, from among available parking spaces. The recommended parking space may be a region having a largest area overlapping the parking guide image, from among the available parking spaces.

The processor 170 may receive user input while the recommended parking space is displayed. Here, the user input may be touch input received through the display 180. The user input may be a parking command. Here, the user input may be referred to as third user input to be discriminated from other user inputs.

Upon reception of the third user input for parking, the processor 170 may provide a control signal for parking.

The processor 170 may control the recommended parking space to be displayed on the around view image displayed on the display 180. Here, the recommended parking space may be determined according to at least one of previous parking experience, detected surrounding environment and a detected object.

For example, the processor 170 may accumulate and store information about a parking space during parking. The processor 170 may calculate a user-preferred parking space on the basis of the stored parking space information. The processor 170 may provide a recommended parking space on the basis of the calculated user-preferable parking space.

For example, the processor 170 may receive surrounding environment information. The processor 170 may provide a recommended parking space on the basis of the surrounding environment information. When the vehicle is parked when it is snowing or raining, the processor 170 may provide a parking space with a roof as a recommended parking space. When the intensity of radiation of sunlight exceeds a reference value, the processor 170 may provide a shaded parking space as a recommended parking space.

For example, the processor 170 may receive information about a neighboring object. The processor 170 may provide a recommended parking space on the basis of the information about the neighboring object. When an expensive vehicle is parked around the vehicle, the processor 170 may provide a parking space at a distance from the expensive neighboring vehicle by a predetermined distance or longer as a recommended parking space such that the vehicle is not parked near the expensive vehicle.

The processor 170 may detect an object located around a parking region. The processor 170 may detect an object located around the parking region by processing an around view image of the vehicle and may calculate a distance between the vehicle and the object. Alternatively, the processor 170 may detect the object located around the parking region through a distance detector (150 of FIG. 4B) and calculate the distance between the vehicle and the object. Alternatively, the processor 170 may detect the object located around the parking region through the cameras which will be described with reference to FIG. 6 and calculate the distance between the vehicle and the object.

When the vehicle is parked according to the parking guide image, the processor 170 may display estimated distances between the vehicle 700 and neighboring objects through the display 180.

Upon calculation of distances between the vehicle 700 and the objects, the processor 170 may provide a signal for controlling a distance between the door at the side of the driver's seat of the vehicle 700 and an object located at the side of the driver's seat to exceed a reference value, thereby securing a space where the driver exits the vehicle.

When the vehicle 700 has been parked, the processor 170 may receive surrounding environment information. The processor 170 may receive information sensed by the sensing unit 760 or information acquired through a communication unit 710 through the interface 130. For example, the processor 170 may receive information about rainfall change, snowfall change, a change in the intensity of sunlight radiated to the vehicle, and the like.

When the surrounding environment changes while the vehicle has been parked, the processor 170 may provide a signal for controlling the parked vehicle to be moved in response to the surrounding environment change. Here, the surrounding environment change may be rainfall change, snowfall change, or change of the intensity of sunlight radiated to the vehicle.

For example, when rainfall or snowfall changes while the vehicle has been parked in an outdoor parking lot, the processor 179 may provide a signal for controlling the parked vehicle to move to an indoor parking lot and park therein.

When the intensity of sunlight radiated to the vehicle exceeds a reference value while the vehicle has been parked in an outdoor parking lot, the processor 170 may provide a signal for controlling the parked vehicle to move to an indoor parking lot and park therein. Otherwise, the processor 170 may provide a signal for controlling the parked vehicle to be move to a shaded parking lot and park there.

Subsequently, the processor 170 may notify the user of completion of movement of the parked vehicle. The processor 170 may transmit parking completion information to the mobile terminal 600 of the user through the communication unit 120. Specifically, the processor 170 may transmit information such as whether the parked vehicle is moved, a parking place, the reason of movement of the parked vehicle, parking time and the like to the mobile terminal 600 of the user.

Upon completion of parking, the processor 170 may set reserved parking for a predetermined available parking space according to user input.

When a reserved parking region is set by the user while the vehicle has been parked, the processor 170 may provide a control signal for controlling the parked vehicle to be moved to the reserved parking region. Here, the processor 170 may determine whether another vehicle has been parked in the corresponding reserved parking region and provide the control signal for controlling the parked vehicle to be moved to the reserved parking region when another vehicle is not parked in the corresponding parking region.

The processor 170 may be implemented as at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors and electrical units for executing other functions.

The processor 170 may be controlled by the controller 770.

The display 180 may display information processed by the processor 170. The display 180 may display an image related to operation of the apparatus 100 for parking a vehicle.

The display 180 may display an around view image generated by the processor 170. When the display 180 displays the around view image, the display 180 may provide various user interfaces and may include a touch sensor through which touch input for a provided user interface may be applied. For example, the display 180 may receive user input applied to the around view image.

The display 180 may display an around view image generated by combining images acquired by the plurality of cameras 195. Here, the around view image may be a top view image or a bird's eye view image.

The display 180 may be implemented such that an image is displayed on the room mirror, the side mirror or the side window glass of the vehicle.

For example, the display 180 may be provided to the room mirror or the side mirror. In this case, the display 180 may usually function as a mirror and display an image when a predetermined event is generated.

For example, the display 180 may be implemented as a transparent display and provided in proximity to the side window glass. Alternatively, the display 180 may include a projection module which projects an image onto the side window glass.

The display 180 may be implemented to display an image on a front windshield.

For example, the display 180 may be implemented as a transparent display and provided in proximity to the front windshield. Alternatively, the display 180 may include a projection module which projects an image onto the front windshield.

The audio output unit 185 may output a sound on the basis of an audio signal processed by the processor 170. To this end, the audio output unit 185 may include at least one speaker.

The power supply unit 190 may supply power necessary to operate each component under the control of the processor 170. Particularly, the power supply unit 190 may be provided with power from a battery in the vehicle.

The cameras 195 may acquire an around view image of the vehicle. The cameras 195 include a plurality of cameras which may acquire images at the positions thereof.

For example, the cameras 195 may include a left camera 195a which is provided to the left side of the vehicle 700 and acquires a left view image, a right camera 195c which is provided to the right side of the vehicle 700 and acquires a right view image, a rear camera 195b which is provided to the backside of the vehicle 700 and acquires a rear view image and a front camera 195d which is provided to the front of the vehicle 700 and acquires a front view image. In this case, the left camera 195a, the right camera 195c, the rear camera 195b and the front camera 195d preferably face the ground at a predetermined angle.

It is desirable that the cameras 195 be wide-angle cameras in order to provide an around view image. According to an implementation, the cameras 195 may include fisheye lenses.

According to an implementation, the cameras 195 may process infrared light and visible light together. In this case, the cameras 195 may include a light output unit for outputting infrared light, a beam splitter for splitting received light into infrared light and visible light, a first optical sensor for processing the infrared light and a second optical sensor for processing the visible light. The processor 170 may calculate a distance between the vehicle 700 and an object on the basis of the infrared light. In addition, the processor 170 may process an image on the basis of the visible light.

The apparatus 100 for parking a vehicle, illustrated in FIG. 4B, is similar to the apparatus for parking a vehicle, shown in FIG. 4A, and is distinguished from the apparatus 100 for parking a vehicle of FIG. 4A in that the former further includes the distance detector 150.

A description will be given of the apparatus for parking a vehicle, focusing on the distance detector 150, with reference to FIG. 4B.

The distance detector 150 may detect an object. The distance detector 150 may detect a distance between the vehicle and the detected object.

The distance detector 150 may include at least one of an ultrasonic sensor, lidar, radar and a TOF camera.

Object information detected by the distance detector 150 may be provided to the processor 170. Here, the object information may include information on the distance between the vehicle and the corresponding object.

The processor 170 may receive the object information from the distance detector 150.

Figure 5A:
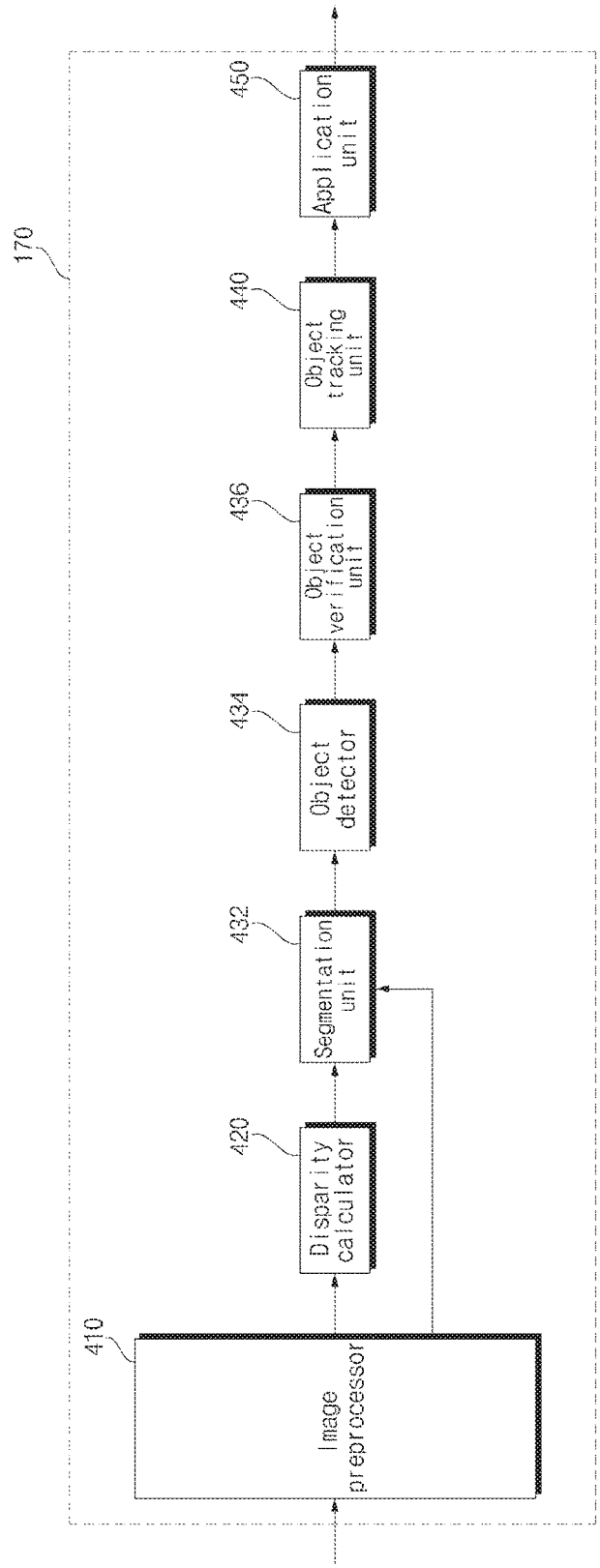
FIGS. 5A and 5B are block diagrams illustrating examples of processors shown in FIGS. 4A and 4B.
Figure 5B:
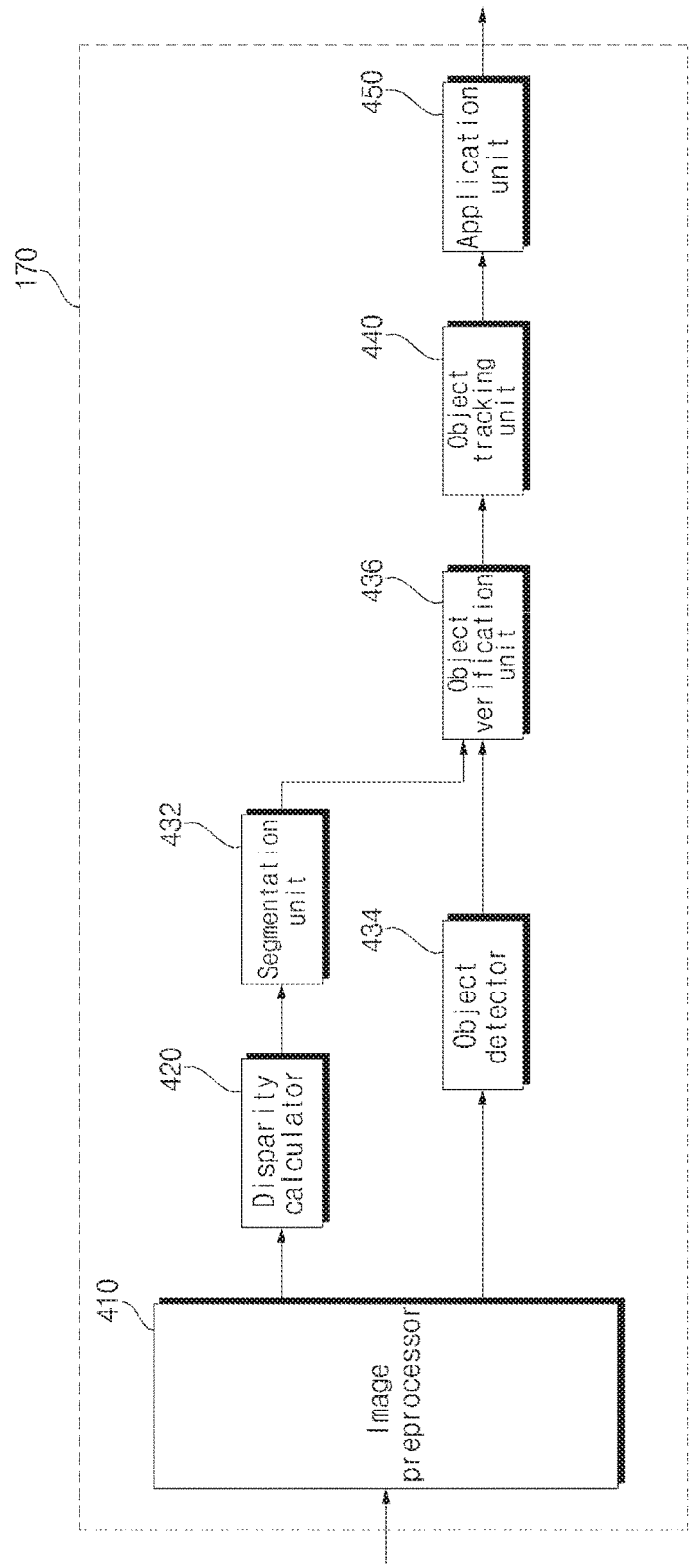
Figure 5C:
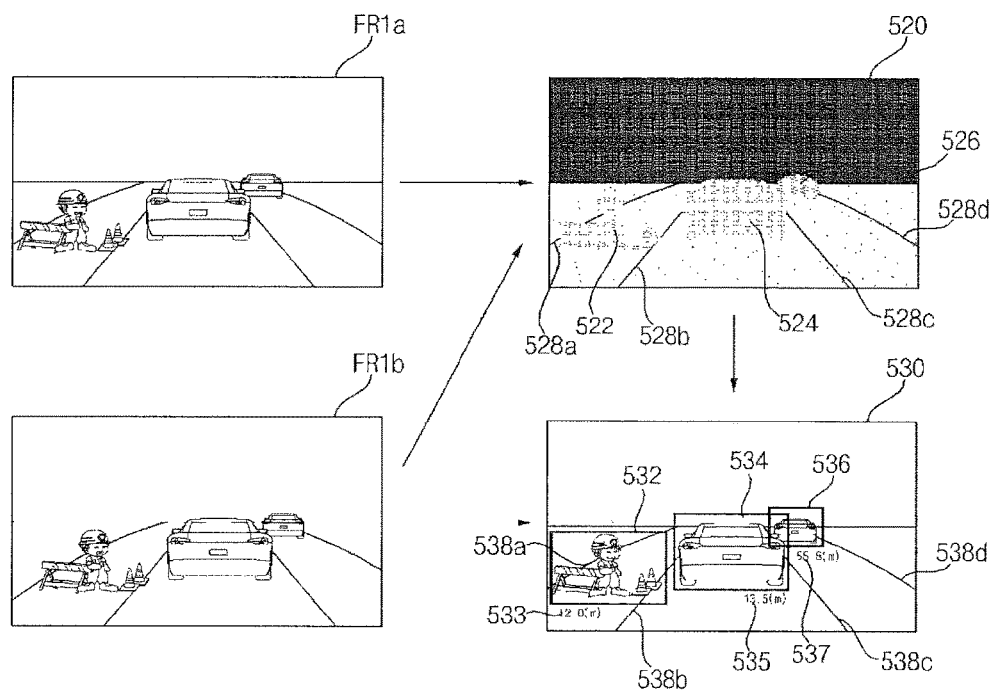
FIG. 5C is a diagram illustrating an example of object detection performed by the processors shown in FIGS. 5A and 5B.

FIGS. 5A and 5B are block diagrams of the processors shown in FIGS. 4A and 4B and FIG. 5C illustrate object detection performed by the processors of FIGS. 5A and 5B.

FIG. 5A is a block diagram of the processor 170. Referring to FIG. 5A, the processor 170 of the apparatus 100 for parking a vehicle may include an image pre-processor 410, a disparity calculator 420, a segmentation unit 432, an object detector 434, an object verification unit 436, an object tracking unit 440 and an application unit 450.

The image pre-processor 410 may receive a plurality of images or a generated around view image from the plurality of cameras 195a to 195d and pre-process the images or the around view image.

Specifically, the image pre-processor 410 may perform noise reduction, rectification, calibration, color enhancement, color space conversion (CSC), interpolation and camera gain control on the plurality of images or the generated around view image. Accordingly, it is possible to obtain an image clearer than the images acquired by the plurality of cameras 195a to 195d or the generated around view image.

The disparity calculator 420 may receive the plurality of images or the around view image preprocessed by the image preprocessor 410, perform stereo matching on the plurality of images sequentially received for a predetermined time or the generated around view image and obtain a disparity map according to stereo matching. For example, disparity information about the surroundings of the vehicle may be obtained.

Stereo matching may be performed per pixel of the images or in units of predetermined blocks. The disparity map may refer to a map that shows binocular parallax information of images, For example, left and right images, as numerical values.

The segmentation unit 432 may perform segmentation and clustering of the images on the basis of the disparity information from the disparity calculator 420.

Specifically, the segmentation unit 432 may separate a background and a foreground from at least one of the images on the basis of the disparity information.

For example, a region having disparity information less than a predetermined value in a disparity map may be calculated as a background and excluded. Accordingly, a foreground may be separated.

As another example, a region having disparity information that exceeds the predetermined value in the disparity map may be calculated as a foreground and extracted. Accordingly, the foreground may be separated.

As described above, a foreground and a background may be separated on the basis of disparity information extracted based on an image so as to increase a signal processing rate and to decrease signal processing quantity during the following object detection.

The object detector 434 may detect an object on the basis of image segments from the segmentation unit 432.

For example, the object detector 434 may detect an object for at least one image on the basis of disparity information.

Specifically, the object detector 434 may detect an object for at least one image. For example, the object detector 434 may detect an object from a foreground separated through image segmentation.

The object verification unit 436 classifies and verifies separated objects.

To this end, the object verification unit 436 may use an identification method using a neural network, SVM (Support Vector Machine) scheme, an identification method according to AdaBoost using Haar-like features, HOG (Histograms of Oriented Gradients) or the like.

The object verification unit 436 may compare objects stored in the memory 140 with detected objects to verify the detected objects.

For example, the object verification unit 436 may verify neighboring vehicles, lanes, road surfaces, signs, dangerous areas and tunnels around the vehicle.

The object tracking unit 440 tracks verified objects. For example, the object-tracking unit 440 may verify an object included in sequentially acquired images, calculate the motion or motion vector of the verified object and track movement of the object on the basis of the calculated motion or motion vector of the object. Accordingly, the object-tracking unit 440 may track neighboring vehicles, lanes, road surfaces, signs, dangerous areas and the like around the vehicle.

FIG. 5B is a block diagram of the processor according to another implementation of the present disclosure.

Referring to FIG. 5B, the processor 170 has the same internal components as the processor 170 shown in FIG. 5A but differs from the processor 170 of FIG. 5A with respect to signal processing order. A description will be given of only the difference.

The object detector 434 may receive a plurality of images or a generated around view image and detect objects included in the plurality of images or the generated around view image. The object detector 434 may directly detect objects from the plurality of images or the generated around view image rather than detecting objects for segmented images on the basis of disparity information, distinguished from FIG. 5A.

The object verification unit 436 classifies and verifies detected and separated objects based on image segments from the segmentation unit 432 and the objects detected by the object detector 434.

To this end, the object verification unit 436 may use an identification method using a neural network, SVM, an identification method according to AdaBoost using Haar-like feature, HOG or the like.

FIG. 5C is a view for explaining operation of the processor 170 on the basis of images respectively acquired in first and second frame periods.

Referring to FIG. 5C, the plurality of cameras 195a to 195d sequentially acquire images FR1a and FR1b for the first and second frame periods.

The disparity calculator 420 of the processor 170 receives the images FR1a and FR1b processed by the image preprocessor 410 and performs stereo matching on the received images FR1a and FR1b to obtain a disparity map 520.

The disparity map 520 represents the binocular parallax between the images FR1a and FR1b as levels. A higher disparity level represents a shorter distance to the vehicle and a lower disparity level represents a longer distance to the vehicle.

The display map may be displayed such that a higher disparity level corresponds to higher luminance and a lower disparity level corresponds to lower luminance.

FIG. 5C shows that first to fourth lanes 528a, 528b, 528c and 528d respectively have disparity levels corresponding thereto and a construction area 522, a first preceding vehicle 524 and a second preceding vehicle respectively have disparity levels corresponding thereto in the disparity map 520.

The segmentation unit 432, the object detector 434 and the object verification unit 436 respectively perform segmentation, object detection and object verification on at least one of the images FR1a and FR1b based on the disparity map 520.

FIG. 5C illustrates object detection and verification for the second image FR1b using the disparity map 520.

For example, first to fourth lanes 538a, 538b, 538c and 538d, a construction area 532, a first preceding vehicle 534 and a second preceding vehicle 536 in an image 530 may be detected and verified.

The object-tracking unit 440 may track verified objects by continuously acquiring images.

Figure 6:
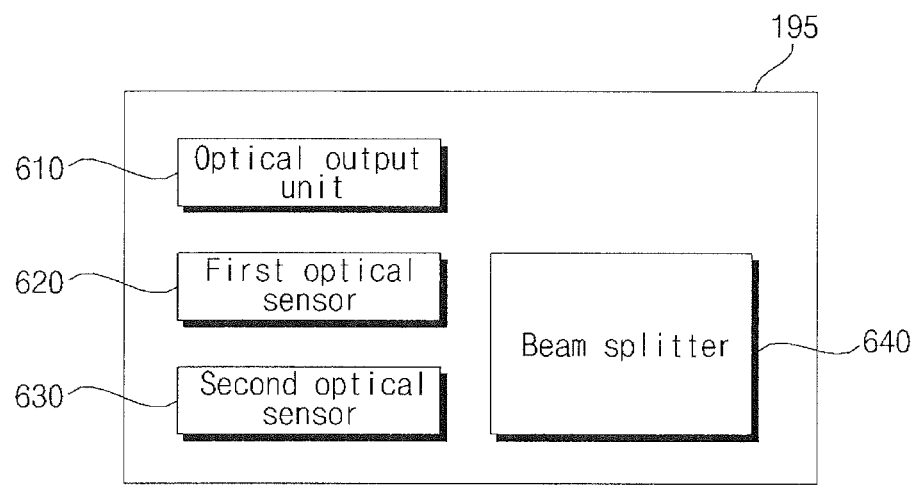
FIG. 6 is a block diagram illustrating an example of a camera.

FIG. 6 is a block diagram of a camera according to an implementation of the present disclosure.

Referring to FIG. 6, the camera 195 may include an optical output unit 610, a first optical sensor 620, a second optical sensor 630 and a beam splitter 640.

The optical output unit 610 may output infrared light. The optical output unit 610 may include a light source for generating infrared light and a lens.

The first optical sensor 620 may process infrared light. The first optical sensor 620 may convert the infrared light into an electrical signal. The first optical sensor 620 may include at least one photodiode. The first optical sensor 620 may include a CMOS (complementary metal-oxide-semiconductor) or a CCD (charge-coupled device) sensor.

The second optical sensor 630 may process visible light. The second optical sensor 630 may convert visible light into an electrical signal. The second optical sensor 630 may include at least one photodiode. The second optical sensor 630 may include a CMOS or a CCD.

The beam splitter 640 may split received light into infrared light and visible light. The beam splitter 640 may guide the infrared light split from the received light to the first optical sensor 620. The beam splitter 640 may guide the visible light split from the received light to the second optical sensor 630.

When a plurality of cameras 195 is provided, each camera may include the optical output unit, the first optical sensor, the second optical sensor and the beam splitter.

The processor 170 may calculate a distance between the corresponding vehicle and an object based on TOF (Time of Flight) of infrared light sensed through the first optical sensor 620. The processor 170 may perform computer vision based image processing based on visible light sensed through the second optical sensor 630.

Figure 7A:
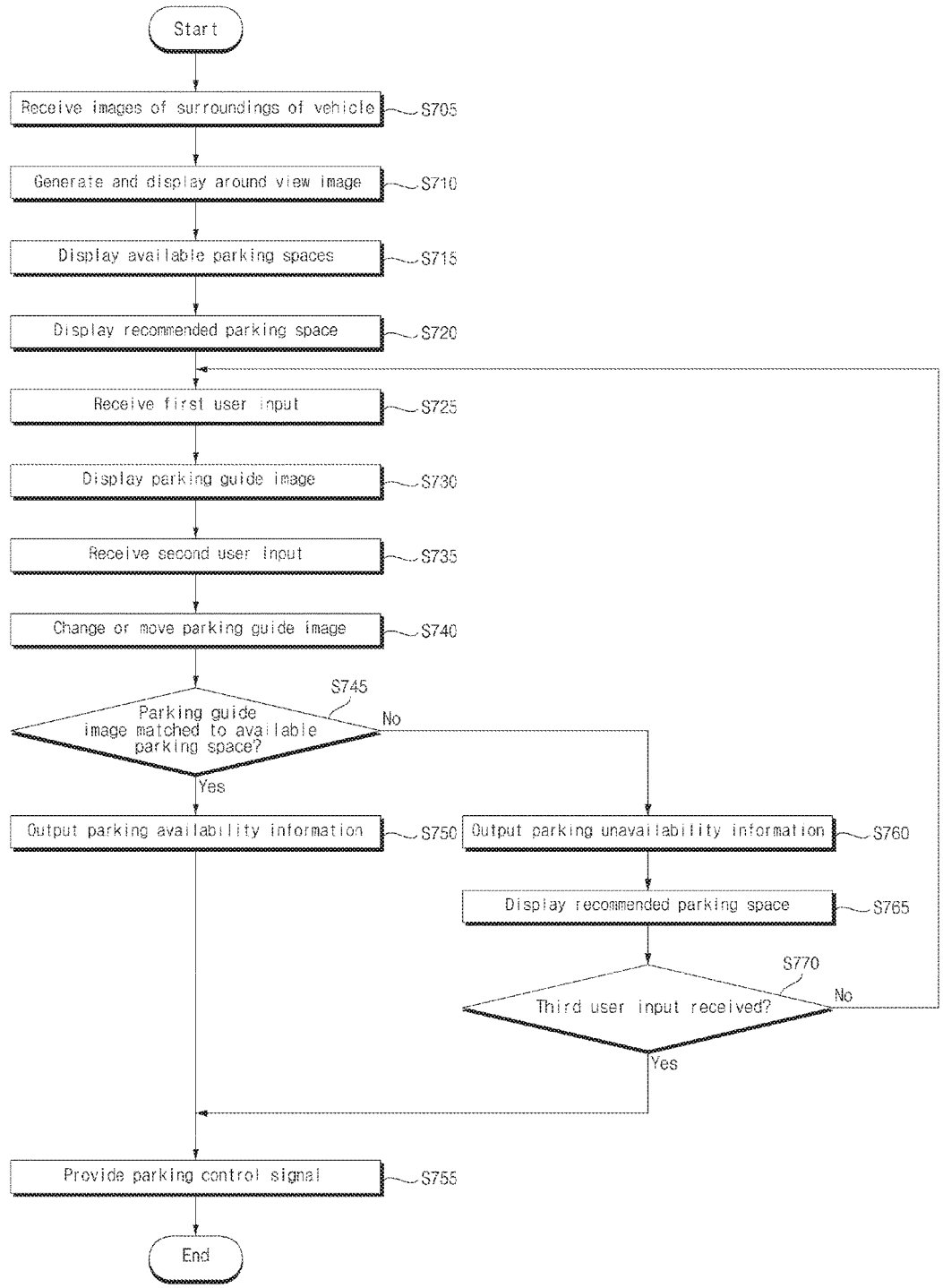
FIGS. 7A, 7B, and 7C are flowcharts illustrating examples of operations of an apparatus for parking a vehicle.
Figure 7B:
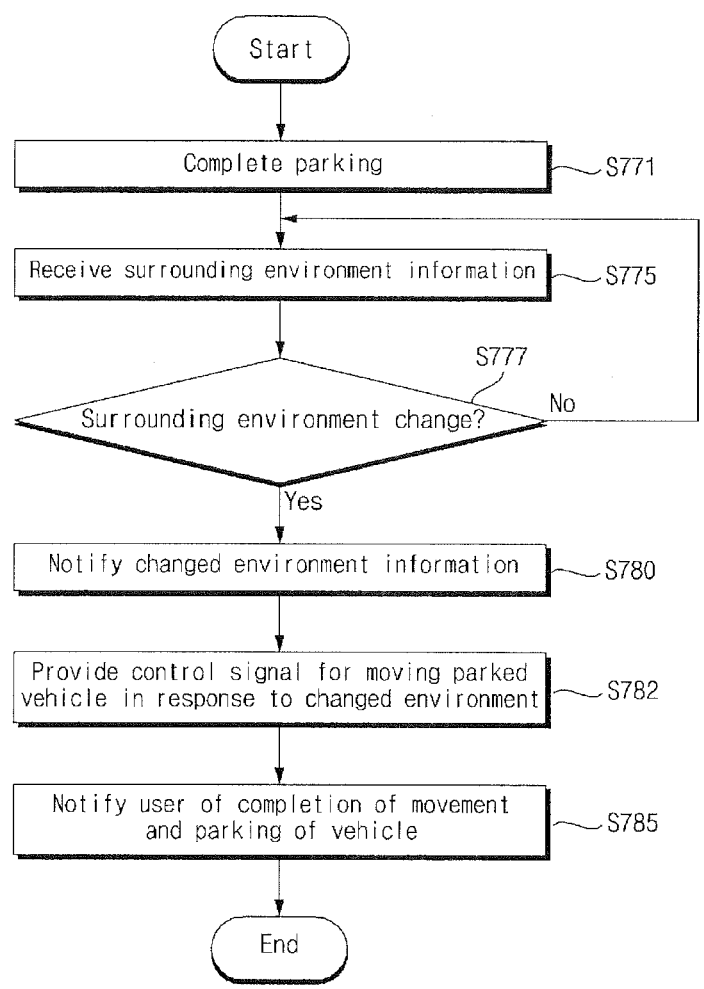
Figure 7C:
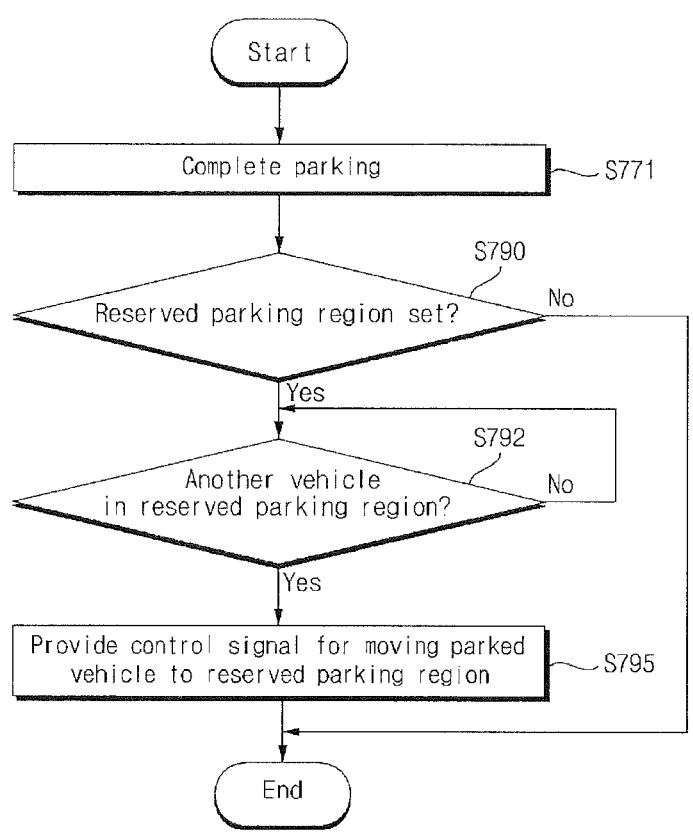

FIGS. 7A to 7C are flowcharts illustrating operation of the apparatus for parking a vehicle according to implementations of the present disclosure.

Referring to FIG. 7A, the processor 170 may receive images of surroundings of the vehicle from the cameras 195 (S705).

The processor 170 may generate an around view image by combining or converting the received images. The processor 170 may display the generated around view image through the display 180 (S710). Here, the around view image may be a top view image or a bird's eye view image.

The processor 170 may display available parking spaces on the around view image displayed on the display 180 (S715). In this case, the processor 170 may overlay the available parking spaces on the around view image.

The processor 170 may display a recommended parking space (S720). The processor 170 may select the recommended parking space from the available parking space. Here, the processor 170 may select the recommended parking space based on previous parking experience, surrounding environment, surrounding objects, user convenience and the like.

The processor 170 may receive the first user input (S725). Here, the first user input may be touch-and-drag input received through the display 180. For example, the first user input may be touch-and-drag input applied to the around view image.

The first user input may be long touch input received through the display 180 while the around view image is displayed on the display 180. The processor 170 may control the size of a parking guide image in proportion to duration of long touch input. For example, the processor 170 may change the size of the parking guide image according to the duration of long touch input while the shape of the parking guide image is preset.

The first user input may be input using the mobile terminal 600. For example, the first user input may be input depending on the position and posture of the mobile terminal 600 disposed to be matched to the parking guide image while the around view image is displayed on the display 180.

The processor 170 may receive information about the position and posture of the mobile terminal 600 through the communication unit 120 with the around view image displayed on the display 180. The processor 170 may control the parking guide image to be displayed on the display 180 according to the information about the position and posture of the mobile terminal 600.

When the position and posture of the mobile terminal 600 are changed, the processor 170 may control the parking guide image to be changed in response to a degree to which the position and posture of the mobile terminal 600 are changed and to be displayed.

The processor 170 may display the parking guide image according to the first user input (S730). The first user input may be touch-and-drag input received through the display 180 while the around view image is displayed on the display 180. Here, the touch-and-drag input may include drag input which connects a touched first point on the around view image and a second point located on horizontal and vertical axes different from the first point without releasing the touch applied to the first point. Here, the parking guide image may have a rectangular shape having a line connecting the first point and the second point as a diagonal line. In this case, the processor 170 may provide a signal for controlling the vehicle to be parked such that the first point corresponds to the front of the vehicle and the second point corresponds to the back of the vehicle.

The processor 170 may receive the second user input with respect to the parking guide image displayed on the display 180 (S735). Here, the second user input may be touch input applied to the parking guide image displayed on the display 180.

The processor 170 may control the position, size, direction or shape of the parking guide image to be changed according to the second user input. In addition, the processor 170 may control the position of the parking guide image displayed on the around view image to be moved (S740).

The processor 170 may determine whether the parking guide image matches an available parking space (S745). The processor 170 may determine whether the parking guide image matches a detected available parking space. For example, the processor 170 may determine whether the parking guide image matches an available parking space detected from the around view image by checking whether the sizes and shapes of the detected available parking space and the parking guide image overlap.

When the parking guide image matches an available parking space, the processor 170 may output parking availability information (S750). The processor 170 may output the parking availability information through the display 180 or the audio output unit 185.

Subsequently, the processor 170 may provide a control signal for parking (S755). The control signal may be provided to the vehicle-driving unit 750. For example, the control signal may be provided to the power source driver 751, the steering driver 752 and the brake driver 753.

When the parking guide image does not match an available parking space in step S745, the processor 170 may output parking unavailability information (S760). The processor 170 may output the parking unavailability information through the display 180 or the audio output unit 185.

Subsequently, the processor 170 may display a recommended parking space (S765). Here, the recommended parking space may be a parking space corresponding to a region closest to the parking guide image, from among the available parking spaces. The recommended parking space may be a parking space having a largest region overlapping with the parking guide image, from among the available parking spaces.

The processor 170 may receive the third user input while the recommended parking space is displayed (S765). Here, the third user input may be touch input received through the display 180. The third user input may be a parking command.

Upon reception of the third user input, the processor 1709 may provide the control signal for parking (S755).

FIGS. 7B and 7C are views for explaining operation of the apparatus for parking a vehicle to move the parked vehicle according to implementations of the present disclosure.

Referring to FIG. 7B, the vehicle may be parked through the operation described with reference to FIG. 7A (S771).

Upon completion of parking of the vehicle, the processor 170 may receive information on the surrounding environment (S775). The processor 170 may receive information sensed by the sensing unit of the vehicle or information acquired through the communication unit 710, through the interface 130. For example, the processor 170 may receive information about rainfall change, snowfall change, a change of the intensity of sunlight radiated to the vehicle, or the like.

When the surrounding environment is changed, the processor 170 may notify the user of the changed environment (S780). The processor 170 may transmit information about the changed environment to the mobile terminal 600 of the user through the communication unit 120.

Subsequently, the processor 170 may provide a control signal for moving the parked vehicle in response to the changed environment (S782). The control signal may be provided to the vehicle-driving unit 750.

For example, when rainfall or snowfall changes while the vehicle has been parked in an outdoor parking lot, the processor 170 may provide a control signal for controlling the parked vehicle to be moved to an indoor parking lot and parked therein.

For example, when the intensity of sunlight radiated to the vehicle exceeds a reference value while the vehicle has been parked in an outdoor parking lot, the processor 170 may provide a control signal for controlling the parked vehicle to move to an indoor parking lot and park therein. Otherwise, the processor 170 may provide a control signal for controlling the parked vehicle to move to a shaded parking space and park therein.

Subsequently, the processor 170 may send information on completion of movement and parking of the vehicle to the user (S785). The processor 170 may transmit information on completion of movement and parking of the vehicle to the mobile terminal 600 of the user through the communication unit 120.

Referring to FIG. 7C, the vehicle may be parked through the operation described with reference to FIG. 7A (S771).

The processor 170 may set reserved parking for a predetermined available parking space according to user input (S790). For example, the user may set reserved parking for a second parking space where another vehicle has been parked while the vehicle has been parked in a first parking space. In this case, the processor 170 may set reserved parking for the second parking space according to user input.

When a predetermined parking space is set to a reserved parking space, the processor 170 may determine whether another vehicle has been parked in the reserved parking space (S792). For example, the processor 170 may determine whether another vehicle has been parked in the reserved parking space through images of surroundings of the vehicle. Alternatively, the processor 170 may receive parking state information from the external server 601, such as a parking management server, through the communication unit 120. The processor 170 may determine whether another vehicle has been parked in the reserved parking space based on the received parking state information.

When no vehicle has been parked in the reserved parking space, the processor 170 may provide a control signal for moving the parked vehicle to the reserved parking space and parking the vehicle therein (S795). Here, the control signal may be provided to the vehicle-driving unit 750.

Figure 8:
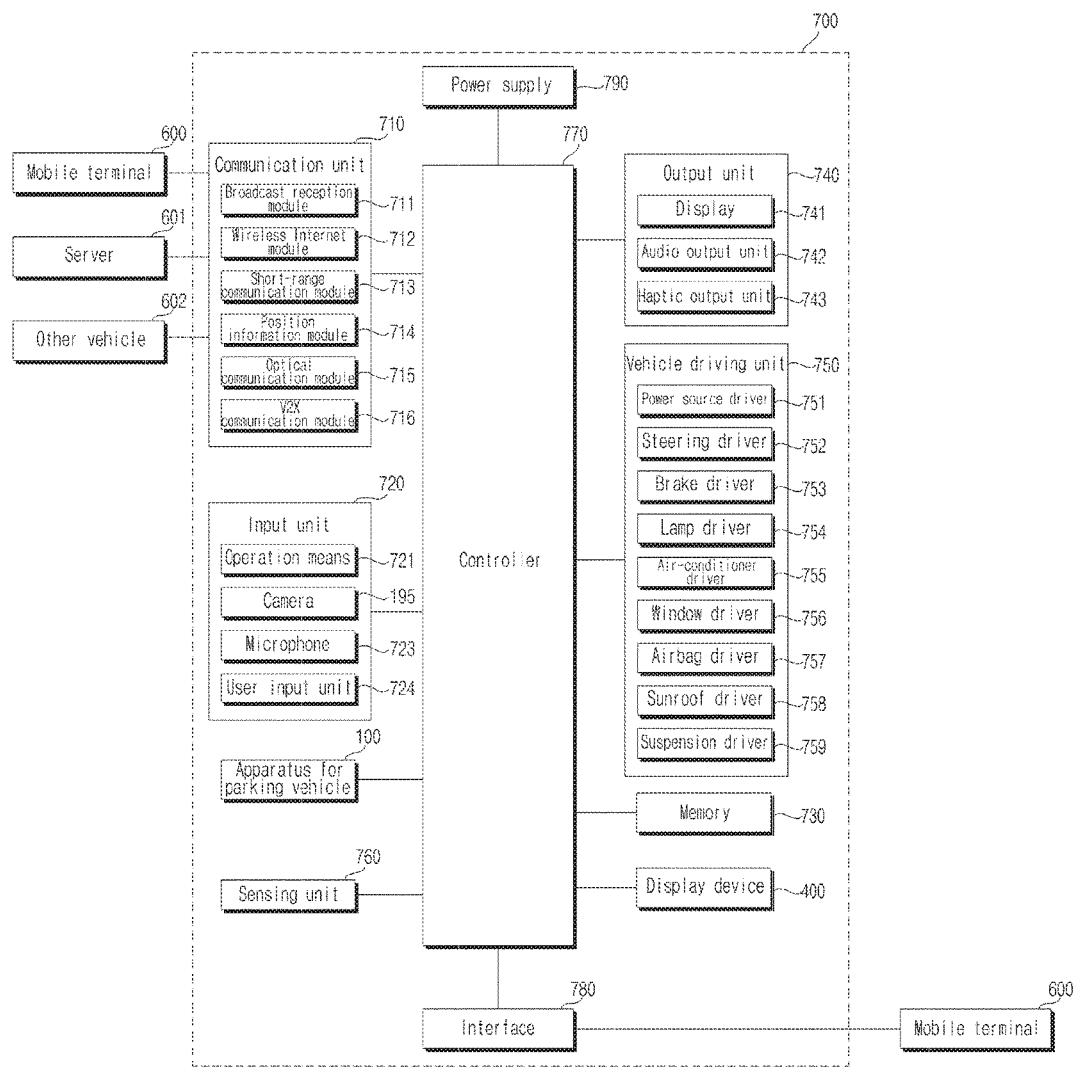
FIG. 8 is a block diagram illustrating an example of a vehicle.

FIG. 8 is a block diagram of the vehicle according to an implementation.

Referring to FIG. 8, the vehicle 700 may include the communication unit 710, an input unit 720, the sensing unit 760, an output unit 740, the vehicle driving unit 750, a memory 730, an interface 780, a controller 770, a power supply 790, the apparatus 100 for parking a vehicle and the vehicle display device 400.

The communication unit 710 may include one or more modules for enabling wireless communication between the vehicle 700 and the mobile terminal 600, between the vehicle 700 and the external server 601 or between the vehicle 700 and another vehicle 602. In addition, the communication unit 710 may include one or more modules for linking the vehicle 700 to one or more networks.

The communication unit 710 may include a broadcast reception module 711, a wireless Internet module 712, a short-range communication module 713, a position information module 714, an optical communication module 715 and a V2X communication module 716.

The broadcast reception module 711 receives broadcast signals or broadcast related information from an external broadcast management server through broadcast channels. Here, broadcast includes radio broadcast and TV broadcast.

The wireless Internet module 712 refers to a module for wireless Internet access and may be embedded in the vehicle 700 or provided to the outside of the vehicle 700. The wireless Internet module 712 is configured to transmit and receive radio signals in communication networks according to wireless Internet technologies.

The wireless Internet technologies include WLAN (Wireless LAN), Wi-Fi (Wireless-Fidelity), Wi-Fi Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced) and the like, and the wireless Internet module 712 transmits and receives data according to at least one of wireless Internet technologies including those not above-mentioned. For example, the wireless Internet module 712 may wirelessly exchange data with the external server 601. The wireless Internet module 712 may receive weather information and traffic information (e.g., TPEG (Transport Protocol Expert Group) information) from the external server 601.

The short-range communication module 713 is a module for short range communication and may support short range communication using at least one of Bluetooth™, RFID (Radio Frequency Identification), Infrared Data Association (IrDA), UWB (Ultra-Wideband), ZigBee, NFC (Near Field Communication), Wi-Fi (Wireless-Fidelity), Wi-Fi Direct and Wireless USB (Wireless Universal Serial Bus).

The short-range communication module 713 may perform short-range communication between the vehicle 700 and at least one external device by establishing wireless area networks. For example, the short-range communication module 713 may exchange data with the mobile terminal 600. The short-range communication module 713 may receive weather information and traffic information (e.g., TPEG information) from the mobile terminal 600. When the user gets in the vehicle 700, the mobile terminal 600 of the user and the vehicle 700 may be paired automatically or according to execution of an application by the user.

The position information module 714 is a module for acquiring the location of the vehicle 700 and a typical example thereof is a GPS (Global Positioning System) module. For example, the vehicle may acquire the location thereof using signals sent from a GPS satellite using the GPS module.

The optical communication module 715 may include a light transmission unit and a light receiving unit. The light receiving unit converts a light signal into an electrical signal so as to receive information. The light receiving unit may include a photodiode (PD) for receiving light. The photodiode converts light into an electrical signal. For example, the light receiving unit may receive information on a preceding vehicle through light emitted from a light source included in the preceding vehicle.

The light transmission unit may include at least one light-emitting element for converting an electrical signal into a light signal. Here, the light-emitting element is preferably an LED (Light Emitting Diode). The light transmission unit converts an electrical signal into a light signal and emits the light signal. For example, the light transmission unit may emit a light signal through flickering of the light-emitting element, which corresponds to a predetermined frequency. According to an implementation, the light transmission unit may include a plurality of light-emitting element arrays. According to an implementation, the light transmission unit may be integrated with a lamp provided to the vehicle 700. For example, the light transmission unit may be at least one of a headlight, a taillight, a brake light, a turn signal lamp and a sidelight. For example, the optical transmission module 715 may exchange data with the other vehicle 602 through optical communication.

The V2X communication module 716 is a module for wireless communication between the vehicle 700 and the external server 601 or the other vehicle 602. The V2X module 716 includes a module in which a vehicle-to-vehicle communication (V2V) or vehicle-to-infrastructure communication (V2I) protocol may be implemented. The vehicle 700 may perform wireless communication with the external server 601 or the other vehicle 602 through the V2X communication module 716.

The input unit 720 may include an operation unit 721, the camera 195, a microphone 723 and a user input unit 724.

The operation unit 721 receives user input for driving the vehicle 700. The operation unit 721 may include a steering input unit 721a, a shift input unit 721b, an acceleration input unit 721c and a brake input unit 721d.

The user applies steering input to the steering input unit 721a. The steering input unit 721a is preferably configured in the form of a wheel such that steering input may be applied according to rotation. According to an implementation, the steering input unit 721a may be configured as a touchscreen, a touch pad or a button.

The user applies inputs with respect to park (P), drive (D), neutral (N), reverse (R) of the vehicle 700 through the shift input unit 721b. The shift input unit 721b is preferably configured in the form of a lever. According to an implementation, the shift input unit 721b may be configured in the form of a touchscreen, a touch pad or a button.

The user applies input with respect to acceleration of the vehicle 700 through the acceleration input unit 721c. The user applies input with respect to reduction of the speed of the vehicle 700 to the brake input unit 721d. The acceleration input unit 721c and the brake input unit 721d are preferably configured in the form of a pedal. According to an implementation, the acceleration input unit 721c or the brake input unit 721d may be configured in the form of a touchscreen, a touch pad or a button.

The camera 195 may include an image sensor and an image-processing module. The camera 195 may process still images or video acquired through the image sensor (e.g., CMOS or CCD). The image-processing module may process still images or video acquired through the image sensor to extract necessary information and transmit the extracted information to the controller 770. The vehicle 700 may include the camera 195 for photographing a front view image or an around view image of the vehicle and an internal camera for photographing the inside of the vehicle.

The internal camera may acquire an image of a person who enters the vehicle. The internal camera may acquire an image for biometrics of the person.

While FIG. 8 shows that the camera 195 is included in the input unit 720, the camera 195 may be included in the apparatus 100 for parking a vehicle as described above with reference to FIGS. 1 to 7.

The microphone 723 may process an external audio signal into electrical data. The processed data may be used in various manners according to functions executed in the vehicle 700. The microphone 723 may convert a voice command of the user into electrical data. The converted electrical data may be transmitted to the controller 770.

According to an implementation, the camera 195 or the microphone 723 may be included in the sensing unit 760 instead of the input unit 720.

The user input unit 724 is used to receive information from the user. Upon input of information through the user input unit 724, the controller 770 may control operation of the vehicle 700 to respond to the input information. The user input unit 724 may include a touch type input unit or a mechanical input unit. According to an implementation, the user input unit 724 may be provided to a region of the steering wheel of the vehicle. In this case, the driver may operate the user input unit 724 with a finger while gripping the steering wheel.

The sensing unit 760 senses signals related to driving of the vehicle 700 and the like. To this end, the sensing unit 760 may include a collision sensor, a wheel sensor, a speed sensor, a tilt sensor, a weight sensor, a heading sensor, a yaw sensor, a gyro sensor, a position module, a front side/rear side sensor, a battery sensor, a fuel sensor, a tire sensor, a steering sensor, a vehicle internal temperature sensor, a vehicle internal humidity sensor, an ultrasonic sensor, radar, lidar and the like.

Accordingly, the sensing unit 760 may acquire sensing signals with respect to vehicle collision information, vehicle position information (GPS information), heading information, speed information, acceleration information, vehicle tilt information, driving/reversing information, battery information, fuel information, tire information, vehicle lamp information, vehicle internal temperature information, vehicle internal humidity information, steering wheel rotation angle information and the like.

In addition, the sensing unit 760 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS) and the like.

Furthermore, the sensor unit 760 may include a biometric information sensor. The biometric information sensor senses and acquires biometric information of a person getting in the car. The biometric information may include fingerprint information, iris-scan information, retina-scan information, hand geometry information, facial recognition information and voice recognition information. The biometric information sensor may include a sensor for sensing biometric information of the person getting in the vehicle. Here, the internal camera and the microphone 723 may operate as a sensor. The biometric information sensor may acquire information on a hand and facial recognition information through the internal camera.

The output unit 740 outputs information processed in the controller 770 and may include a display unit 741, an audio output unit 742 and a haptic output unit 743.

The display unit 741 may display information processed in the controller 770. For example, the display 741 may display vehicle related information. The vehicle related information may include vehicle control information for direct control of the vehicle or vehicle driving assistance information for providing driving guidance to the vehicle-driving unit. In addition, the vehicle related information may include vehicle state information indicating the current state of the vehicle or vehicle driving information related to driving of the vehicle.

The display unit 741 may include at least one of a liquid crystal display (LCD), a thin film transistor-liquid crystal display (TFT LCD), an organic light-emitting diode (OLED), a flexible display, a 3D display and an e-ink display.

The display unit 741 may implement a touchscreen by forming a layered structure with a touch sensor or by being integrated with the touch sensor. Such touchscreen may function as the user input unit 724 that provides an input interface between the vehicle 700 and the user and, simultaneously, provide an output interface between the vehicle 700 and the user. In this case, the display 741 may include a touch sensor for sensing touch applied to the display unit 741 such that a control command is input to the display unit 741 through touch. When touch is applied to the display unit 741, the touch sensor may sense the touch and the controller 770 may generate a control command corresponding to the touch based on the sensed touch. Input applied through touch may be text, figures or menu items that may be indicated or designated in various modes.

The display unit 741 may include a cluster to enable the driver to drive the vehicle and, simultaneously, to check vehicle state information or vehicle driving information. The cluster may be provided on the dashboard. In this case, the driver may check information displayed on the cluster while looking forward.

According to an implementation, the display unit 741 may be implemented as an HUD (Head Up Display). When the display 741 is implemented as an HUD, information may be output through a transparent display provided to the windshield of the vehicle. Alternatively, the display unit 741 may include a projection module so as to output information through an image projected onto the windshield.

The audio output unit 742 converts an electrical signal from the controller 770 into an audio signal and outputs the audio signal. To this end, the audio output unit 742 may include a speaker. The audio output unit 742 may output sound corresponding to operation of the user input unit 724.

The haptic output unit 743 generates haptic output. For example, the haptic output unit 743 may vibrate the steering wheel, a seat belt or a seat to enable the user to recognize haptic output.

The vehicle-driving unit 750 may control operations of various apparatuses of the vehicle. The vehicle-driving unit 750 may receive control signals from the apparatus 100 for parking a vehicle. The vehicle-driving unit 750 may control the apparatuses of the vehicle based on the control signals.

The vehicle-driving unit 750 may include a power source driver 751, a steering driver 752, a brake driver 753, a lamp driver 754, an air-conditioner driver 755, a window driver 756, an airbag driver 757, a sunroof driver 758 and a suspension driver 759.

The power source driver 751 may perform electronic control of a power source of the vehicle 700.

For example, when the power source is a fossil fuel based engine, the power source driver 751 may perform electronic control of the engine so as to control the output torque of the engine. When the power source driver 751 is an engine, the speed of the vehicle may be limited by restricting an engine output torque under the control of the controller 770.

Alternatively, when an electric motor is a power source, the power source driver 751 may control the motor. Accordingly, revolutions per minute (RPM), torque and the like of the motor may be controlled.

The power source driver 751 may receive an acceleration control signal from the apparatus 100 for parking a vehicle. The power source driver 751 may control the power source according to the received acceleration control signal.

The steering driver 752 may electronically control a steering apparatus of the vehicle 700 so as to steer the vehicle 700. The steering driver 752 may receive a steering control signal from the apparatus 100 for parking a vehicle. The power source driver 751 may control the steering apparatus to steer the vehicle according to the received steering control signal.

The brake driver 753 may electronically control a brake apparatus of the vehicle 700. For example, the brake driver 753 may reduce the speed of the vehicle 700 by controlling the operation of a brake provided to the wheels. As another example, the brake driver 753 may adjust the direction of the vehicle 700 to the left or right by differently operating brakes respectively provided to the left and right wheels. The brake driver 753 may receive a deceleration control signal from the apparatus 100 for parking a vehicle. The brake driver 753 may control the brake apparatus according to the received deceleration control signal.

The lamp driver 754 may turn on/turn off lamps provided to the inside and outside of the vehicle 700. In addition, the lamp driver 754 may control illuminance, directions and the like of the lamps. For example, the lamp driver 754 may control the turn signal, brake lamp and the like.

The air-conditioner driver 755 may electronically control an air conditioner of the vehicle 700. For example, the air-conditioner driver 755 may control the air conditioner to supply chilly air to the inside of the vehicle 700 when the internal temperature of the vehicle is high.

The window driver 756 may electronically control a window apparatus of the vehicle 700. For example, the window driver 756 may control opening or closing of left and right windows provided to the side of the vehicle.

The airbag driver 757 may electronically control an airbag apparatus provided to the inside of the vehicle 700. For example, the airbag driver 757 may control the airbag apparatus to operate in a dangerous situation.

The sunroof driver 758 may electronically control a sunroof apparatus of the vehicle 700. For example, the sunroof driver 758 may control opening or closing of a sunroof.

The suspension driver 759 may electronically control a suspension apparatus of the vehicle 700. For example, the suspension driver 759 may reduce vibration of the vehicle 700 by controlling the suspension apparatus when the surface of the road is rough. The suspension driver 759 may receive a suspension control signal from the apparatus 100 for parking a vehicle. The suspension driver 759 may control the suspension apparatus according to the received suspension control signal.

The memory 730 is electrically connected to the controller 770. The memory 730 may store fundamental data about the units, control data for operation control of the units and input/output data. The memory 730 may be various types of storage devices such as a ROM, a RAM, an EPROM, a flash drive and a hard drive. The memory 730 may store various types of data for overall operation of the vehicle 700, such as programs for processing or control.

The interface 780 may function as a passage to various external devices connected to the vehicle 700. For example, the interface 780 may include a port that may be connected to the mobile terminal 600 and be connected to the mobile terminal 600 via the port. In this case, the interface 780 may exchange data with the mobile terminal 600.

In addition, the interface 780 may serve as a passage through which electric energy is supplied to the mobile terminal 600 connected thereto. When the mobile terminal 600 is electrically connected to the interface 780, the interface 780 provides electric energy supplied from the power supply 790 to the mobile terminal 600 under the control of the controller 770.

The controller 770 may control operations of the respective units of the vehicle 700. The controller 770 may be called an ECU (Electronic Control Unit).

The controller 770 may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors) and other electrical units for executing the corresponding functions.

The power supply 790 may supply power necessary for operations of the respective components under the control of the controller 770. Particularly, the power supply 790 may be provided with power from a battery inside the vehicle 700.

The apparatus 100 for parking a vehicle may exchange data with the controller 770. Information, data or control signals generated in the apparatus 100 for parking a vehicle may be output to the controller 770. The apparatus 100 for parking a vehicle may be the apparatus for parking a vehicle described above with reference to FIGS. 1 to 7C.

The vehicle display device 400 may exchange data with the controller 770. The controller 770 may receive navigation information from the vehicle display device 400 or a separate navigation system. Here, the navigation information may include information on a set destination, route information depending on the destination, map information regarding vehicle driving and vehicle location information.

Figure 9:
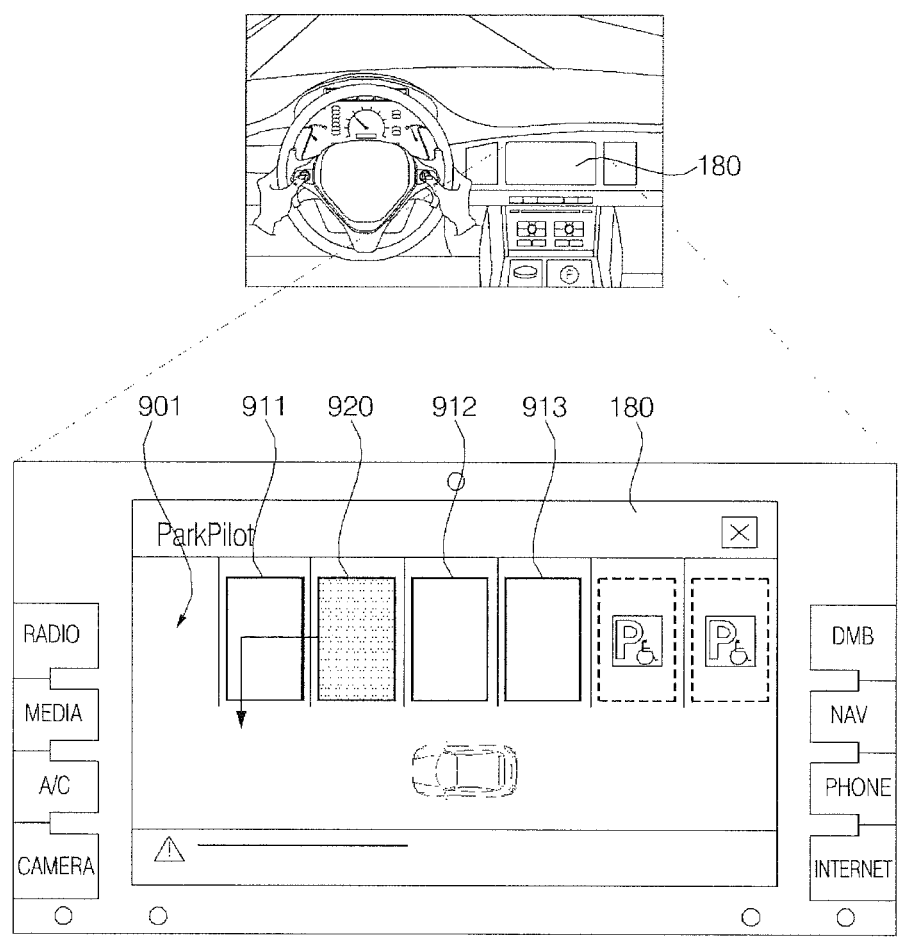
FIG. 9 is a diagram illustrating an example of displaying available parking spaces and a recommended parking space.

FIG. 9 is a view for explaining operation of displaying available parking spaces and a recommended parking space according to an implementation.

Referring to FIG. 9, the processor 170 may acquire images of surroundings of the vehicle from the cameras 195 and generate an around view image. Here, the around view image may be a top view image or a bird's eye view image.

The processor 170 may display the around view image 901 on the display 180.

The processor 170 may display available parking spaces 911, 912, 913 and 920 on the around view image 901 displayed on the display 180. The processor 170 may overlay the available parking space on the around view image 901.

The processor 170 may display the recommended parking space 920 on the around view image 901. The processor 170 may select the recommended parking space 920 from the available parking spaces 911, 912, 913 and 920. Here, the processor 170 may select the recommended parking space 920 based on previous parking experience, surrounding environment, surrounding objects, user convenience and the like.

Figure 10:
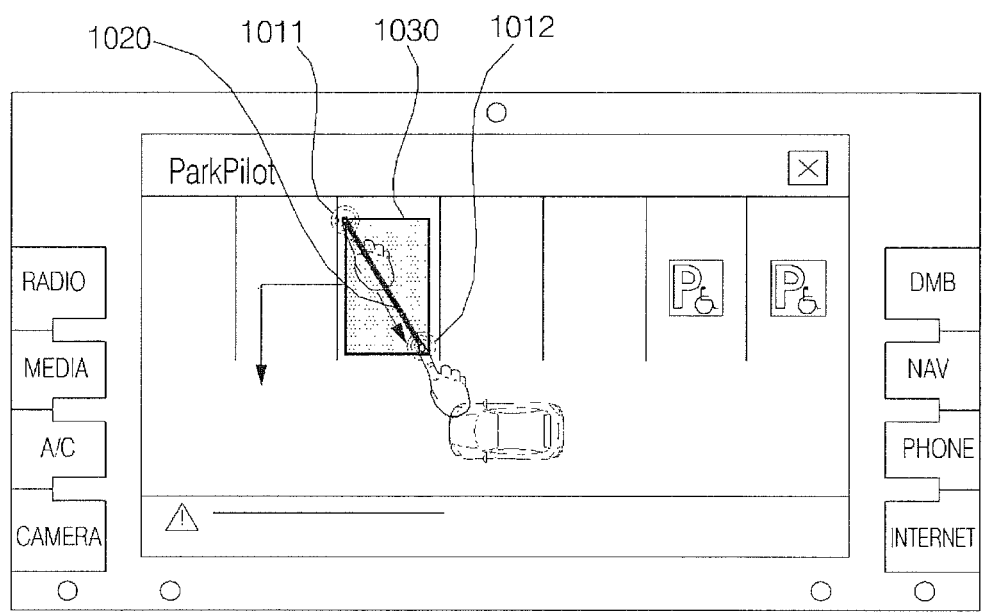
FIG. 10 is a diagram illustrating an example of receiving first user input corresponding to touch-and-drag input.

FIG. 10 is a view for explaining operation of receiving the first user input corresponding to touch-and-drag input according to an implementation.

Referring to FIG. 10, the processor 170 may receive the first user input while the around view image is displayed. The first user input may be touch-and-drag input received through the display 180.

The processor 170 may receive touch input applied to a first point 1011. Subsequently, the processor 170 may receive a drag input starting from the first point 1011 and extending to a second point 1012, with the touch input maintained between the two points. In this case, the processor 170 may display a parking guide image 1030 in a rectangular shape having a line 1020 connecting the first point 1011 and the second point 1012 as a diagonal line. Here, the shorter side of the rectangular shape may correspond to the overall width of the vehicle and the longer side may correspond to the overall length of the vehicle.

The processor 170 may match the shorter side of the parking guide image 1030, which is extended from the first point 1011, to the front side of the vehicle 700 and match the longer side of the parking guide image 1030, which is extended from the second point 1012, to the rear side of the vehicle 700. Then, the processor 170 may provide a control signal for parking the vehicle in the determined direction.

Figure 11:
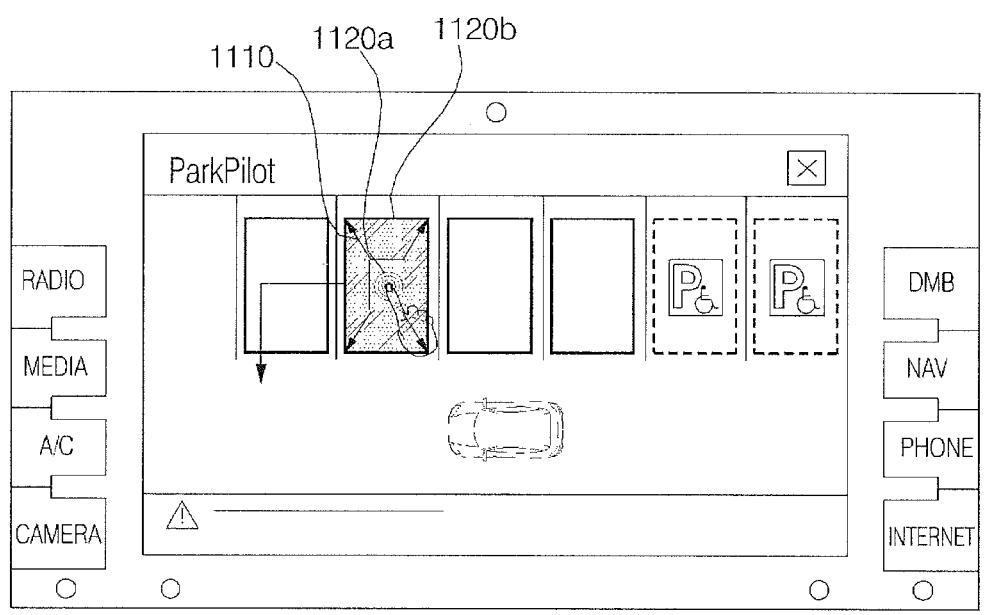
FIG. 11 is a diagram illustrating an example of receiving the first user input corresponding to long touch input.

FIG. 11 is a view for explaining operation of receiving the first user input corresponding to long touch input according to an implementation.

Referring to FIG. 11, the processor 170 may receive the first user input while the around view image is displayed. The first user input may be long touch input 1110 received through the display 180.

The processor 170 may receive touch input applied to a first point. Subsequently, the processor 170 may receive long touch input applied to the first point until the touch input is released. The processor 170 may determine that the touch input is a long touch input, for example, by determining that the touch input has been maintained on the first point for a duration that exceeds a threshold.

In this case, the processor 170 may display a parking guide image 1120a and 1120b in response to touch duration. For example, the processor 170 may control the size of the parking guide image 1120a and 1120b to be changed in response to the duration of the long touch input 1110. For example, the processor 170 may change the size of the parking guide image from a first size 1120a to a second size 1120b in proportion to the touch duration. The processor 170 may reduce the parking guide image when the touch duration exceeds a predetermined time. Subsequently, the processor 170 may gradually increase the size of the parking guide image in proportion to the touch duration.

Figure 12:
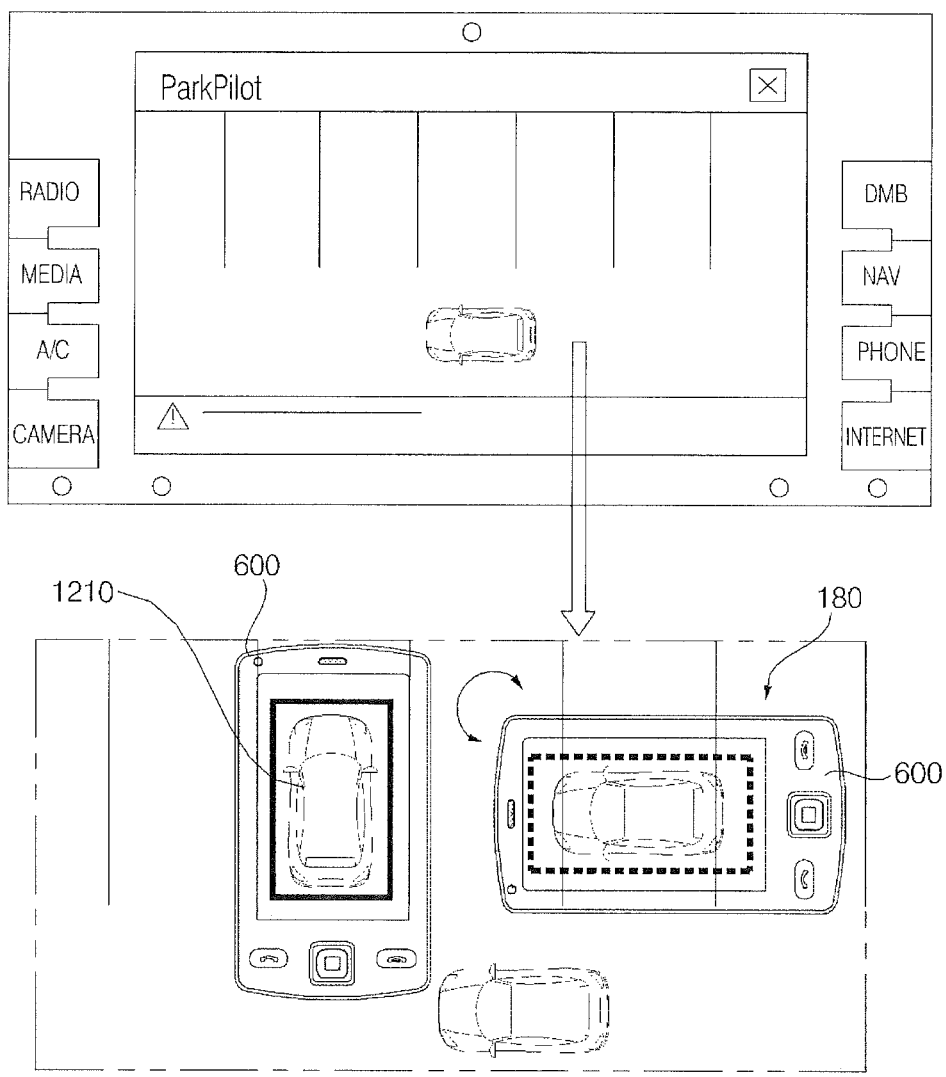
FIG. 12 is a diagram illustrating an example of receiving the first user input through a mobile terminal.

FIG. 12 is a view for explaining operation of receiving the first user input through a mobile terminal according to an implementation.

Referring to FIG. 12, the processor 170 may receive the first user input via the mobile terminal 600 while the around view image is displayed. The first user input may be an input received using the mobile terminal 600, for example using a position and posture of the mobile terminal 600. As such, a user indicate a desired parking region by manipulating a position and posture the mobile terminal 600 relative to the displayed around-view image.

Specifically, the apparatus 100 for parking a vehicle and the mobile terminal 600 may be paired through the communication unit 120. The processor 170 may receive information on the position and posture of the mobile terminal 600 while the apparatus 100 for parking a vehicle and the mobile terminal 600 are paired. The information on the position and posture of the mobile terminal 600 may be acquired through a position sensor and a posture sensor (e.g., acceleration sensor and gyro sensor) included in the mobile terminal 600. As examples, the position of the mobile terminal 600 may correspond to a lateral or vertical position of the mobile terminal 600, and the posture of the mobile terminal 600 may correspond to a rotation of the mobile terminal 600.

The processor 170 may display a parking guide image according to the position and posture of the mobile terminal 600. The parking guide image that is displayed may be adjusted based on movements of the mobile terminal 600. For example, the displayed parking guide image may be changed based on a change in position or posture of the mobile terminal 600

For example, an image 1210 of the vehicle may be displayed on a display of the mobile terminal 600. When the position and posture of the mobile terminal 600 are changed with the mobile terminal 600 approaching the display 180 while the around view image is displayed on the display 180, the processor 170 may change the parking guide image in response to the change of the position and posture of the mobile terminal 600 and display the changed parking guide image. In this case, the user may adjust the position and posture of the mobile terminal 600 while simultaneously checking the around view image displayed on the display 180 and the vehicle image 1210 displayed on the mobile terminal 600.

To receive the first user input using the mobile terminal 600, the display 180 is preferably implemented such that an image is displayed on the windshield or side window glass of the vehicle.

Figure 13:
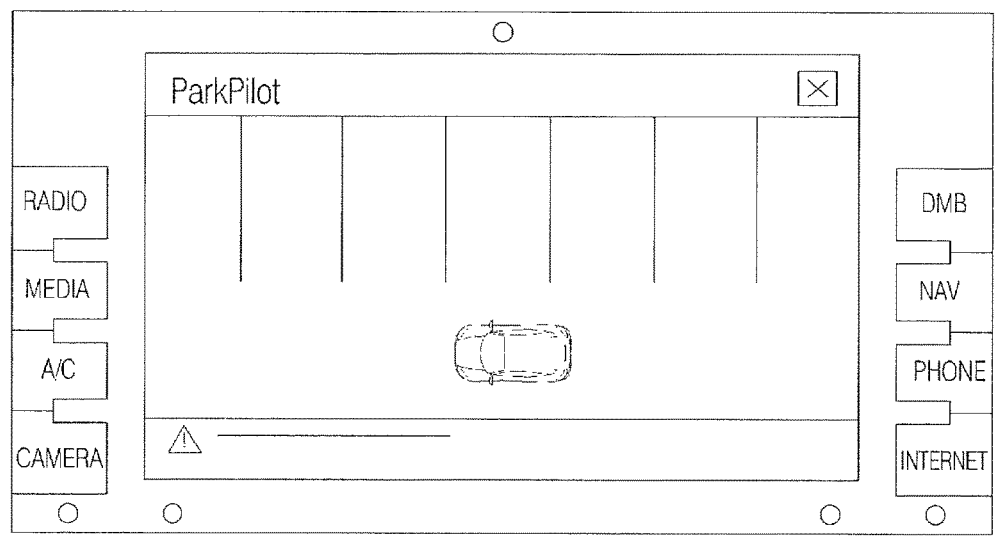
FIG. 13 is a diagram illustrating an example of receiving the first user input through a wearable device.
Figure 13:
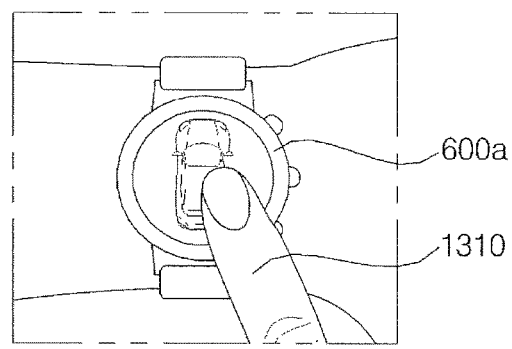

FIG. 13 is a view for explaining operation of receiving the first user input through a wearable device according to an implementation.

Referring to FIG. 13, the processor 170 may receive the first user input while the around view image is displayed. The first user input may be input received using a wearable device 600a. As such, a user may control a parking operation of the vehicle by interacting with the wearable device 600a.

Specifically, the apparatus 100 for parking a vehicle and a wearable device 600a may be paired through the communication unit 120. The processor 170 may receive a user input 1310 applied to the wearable device 600a while the apparatus 100 for parking a vehicle and the wearable device 600a are paired. The processor 170 may provide a parking control signal according to the user input 1310.

Parking control using the wearable device 600a may be used not only when the user is in the vehicle 700 but also when the user is located outside the vehicle 700.

Figure 14A:
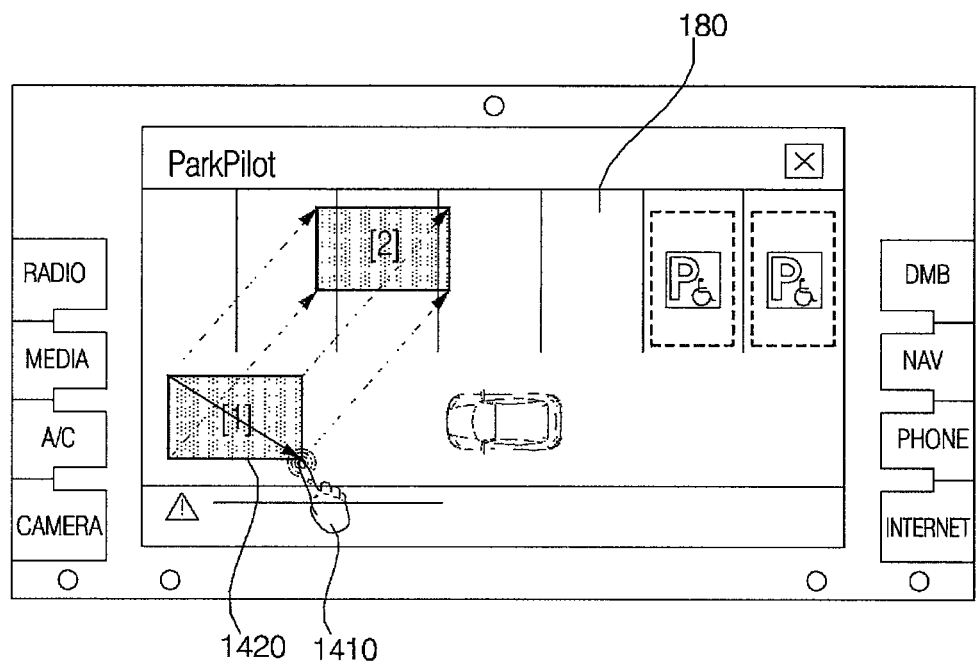
FIGS. 14A and 14B are diagrams illustrating examples of receiving second user input and changing or moving a parking guide image.
Figure 14B:
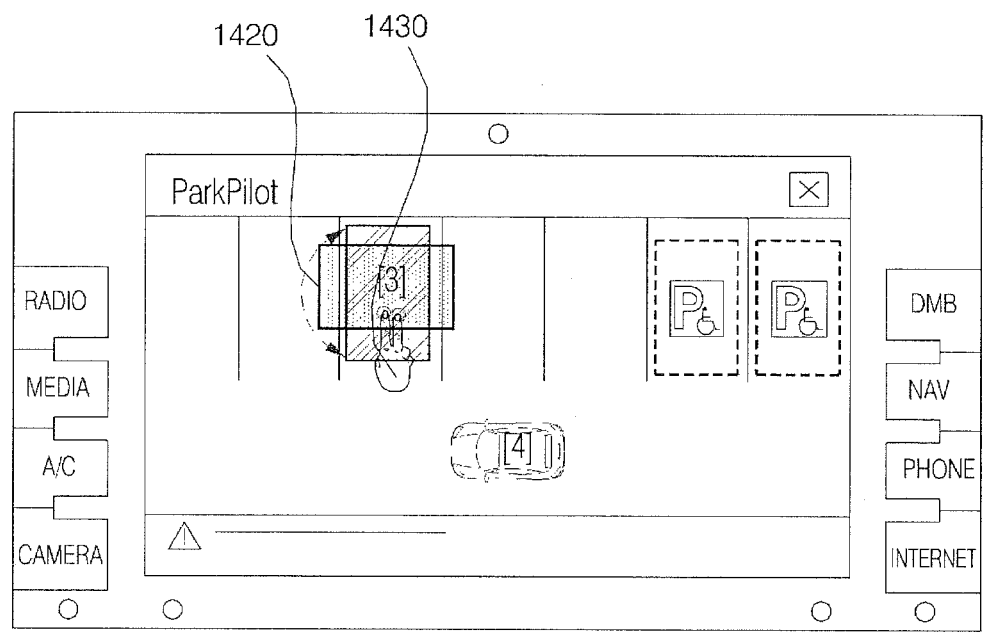

FIGS. 14A and 14B are views for explaining operation of changing or moving a parking guide image by receiving the second user input according to an implementation.

Upon reception of the second user input 1410 while the parking guide image 1420 is displayed, the processor 170 may control the position, size, direction or shape of the parking guide image 1420 to be changed.

Referring to FIG. 14A, the processor 170 may display the parking guide image 1420 according to the first user input that was previously input. Here, the processor 170 may receive the first user input through an arbitrary region other than available parking regions or a recommended parking region.

Subsequently, the processor 170 may receive the second user input 1410 with respect to the parking guide image 1420. The second user input 1410 may be a touch input applied to the parking guide image 1420 displayed on the display 180.

The processor 170 may control the position, size, direction or shape of the parking guide image 1420 to be changed according to the second user input 1410.

For example, when touch-and-drag input with respect to the parking guide image 1420 is received as the second user input 1410, the processor 170 may move the parking guide image 1420 according to the touch-and-drag input.

For example, when touch-and-drag input with respect to the outline or corners of the parking guide image 1420 is received as the second user input, the processor 170 may control the size or shape of the parking guide image 1420 to be changed according to the touch-and-drag input.

Referring to FIG. 14B, when input 1430 of applying double touch and then rotating the touch input is received as the second user input, the processor 170 may control the direction of the parking guide image 1420 to be changed.

Figure 15:
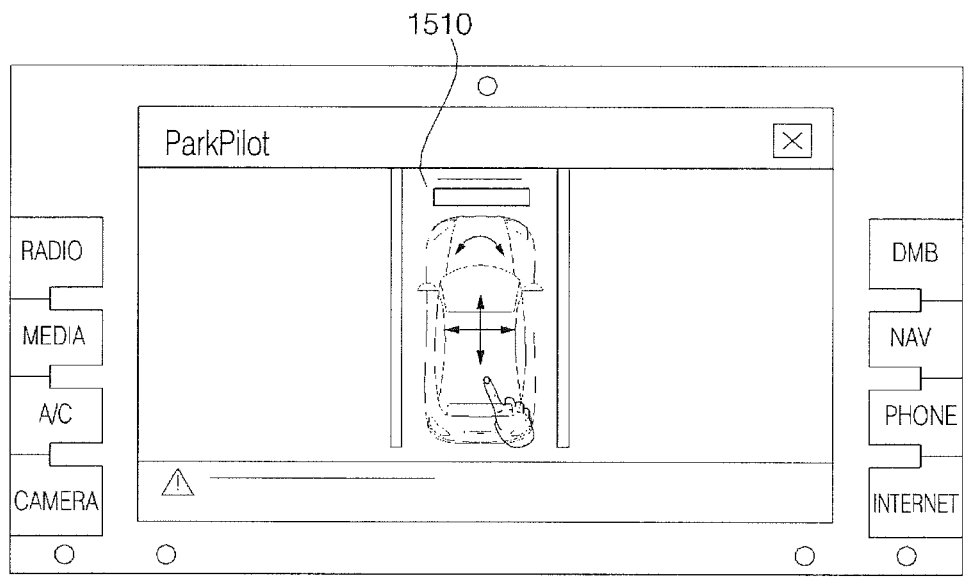
FIG. 15 is a diagram illustrating an example of outputting information indicating that parking is available or unavailable.
Figure 15:
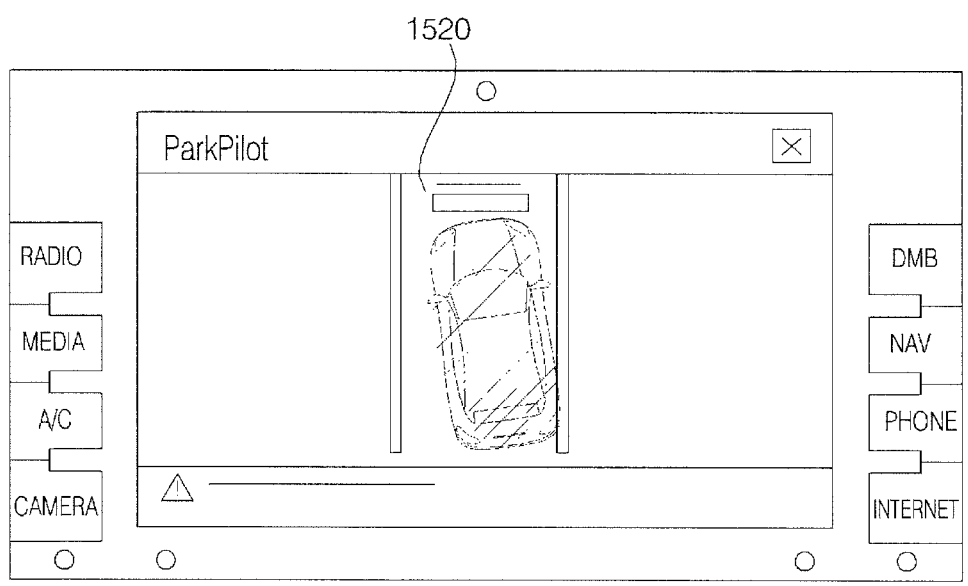

FIG. 15 is a view for explaining operation of outputting parking availability or unavailability information according to an implementation.

Referring to FIG. 15, the processor 170 may determine whether a parking guide image matches an available parking space. For example, when the vehicle 700 is parked according to the parking guide image, the processor 170 may determine whether the parking guide image matches the available parking space by checking whether the vehicle can be parked within a parking line.

When the parking guide image matches the available parking space, the processor 170 may display a parking availability notice 1510 on the display 180. For example, the processor 170 may display the parking availability notice 1510 by displaying the parking guide image in a first color.

Furthermore, the processor 170 may display the parking availability notice 1510 by displaying an image of the vehicle parked within the parking line. Here, the vehicle image may be displayed in the first color.

When the parking guide image does not match the available parking space, the processor 170 may display a parking unavailability notice 1520 on the display 180. For example, the processor 170 may display the parking unavailability notice 1510 by displaying the parking guide image in a second color. Furthermore, the processor 170 may display the parking unavailability notice 1510 by displaying an image of the vehicle on the parking line. Here, the vehicle image may be displayed in the second color. The second color may differ from the first color.

When the parking guide image does not match the available parking space, the processor 170 may display a recommended parking space. The recommended parking space may be a parking space corresponding to a region closest to the parking guide image, from among available parking spaces. The recommended parking space may be a parking space having a largest region overlapping with the parking guide image, from among the available parking spaces.

When the parking guide image crosses the parking line, the processor 170 may determine a parking space having a largest region overlapping with the parking guide image, from among the available parking spaces, as the recommended parking space.

Figure 16:
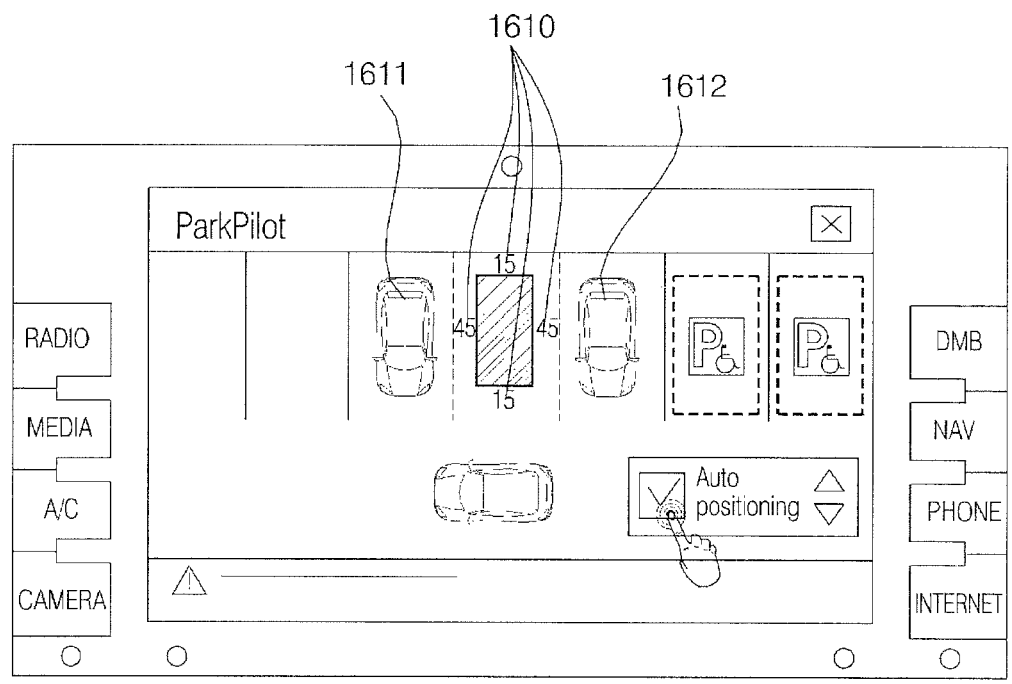
FIG. 16 is a diagram illustrating an example of displaying an estimated distance to a neighboring object when a vehicle is parked based on a parking guide image.

FIG. 16 is a view for explaining operation of displaying estimated distances between the vehicle and neighboring objects when the vehicle is parked according to the parking guide image in accordance with an implementation.

Referring to FIG. 16, the processor 170 may detect objects located near a parking area. The processor 170 may detect objects located near the parking area by processing images of surroundings of the vehicle and calculate distances between the vehicle and the objects. The processor 170 may detect the objects located near the parking area through the distance detector (150 of FIG. 4B) and calculate distances between the vehicle and the objects. The processor 170 may detect the objects located near the parking area through the camera described with reference to FIG. 6 and calculate distances between the vehicle and the objects.

The distances between the vehicle and the objects may be estimated distances between the vehicle 700 and respective sides of a parking line when the vehicle 700 is parked. The distances between the vehicle and the objects may be estimated distances between the vehicle 700 and other vehicles 1611 and 1612 when the vehicle 700 is parked. The distances between the vehicle and the objects may be estimated distances between the vehicle 700 and structures (e.g., a wall, a pillar, a door and the like) near the vehicle 700 when the vehicle 700 is parked.

When the vehicle 700 is parked according to the parking guide image, the processor 170 may display an indication of the estimated distances 1610 between the vehicle 700 and the objects on the display 180 before the vehicle is parked. In some implementations, the processor 170 may display numerical values corresponding to the estimated distances 1610.

Figure 17:
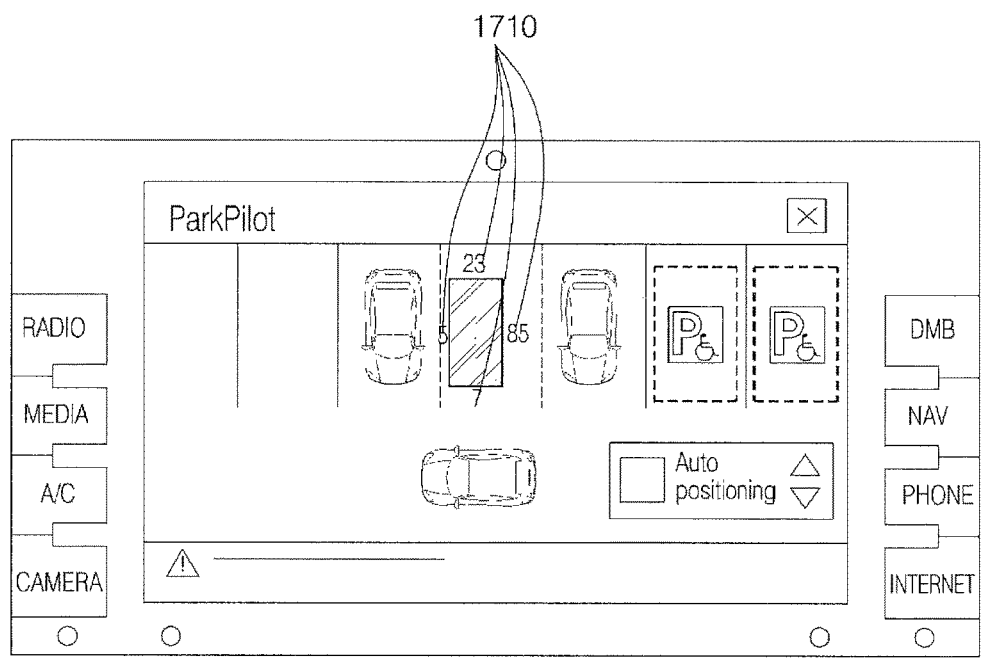
FIG. 17 is a diagram illustrates an example of a parking operation in consideration of a space where a driver exits a vehicle.

FIG. 17 is a view for explaining parking operation in consideration of a space where the driver exits the vehicle according to an implementation.

Referring to FIG. 17, upon calculation of distances between the vehicle 700 and neighboring objects, the processor 170 may control the position of a parking guide image 1720 such that a distance between the door at the driver's seat of the vehicle 700 and an object located at the side of the driver's seat exceeds a reference value.

In this case, when the vehicle 700 is parked according to the parking guide image at a controlled position, the processor 170 may display estimated distances 1710 between the vehicle 700 and the objects through the display 180.

Then, the processor 170 may provide a control signal for parking the vehicle according to the controlled parking guide image 1720.

Figure 18:
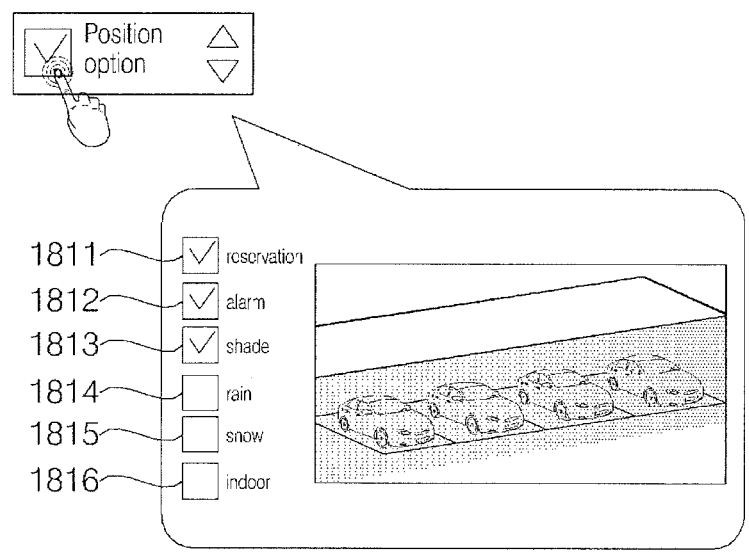
FIG. 18 is a diagram illustrating an example of moving a parked vehicle and parking the moved vehicle according to surrounding environment change after parking.
Figure 19:
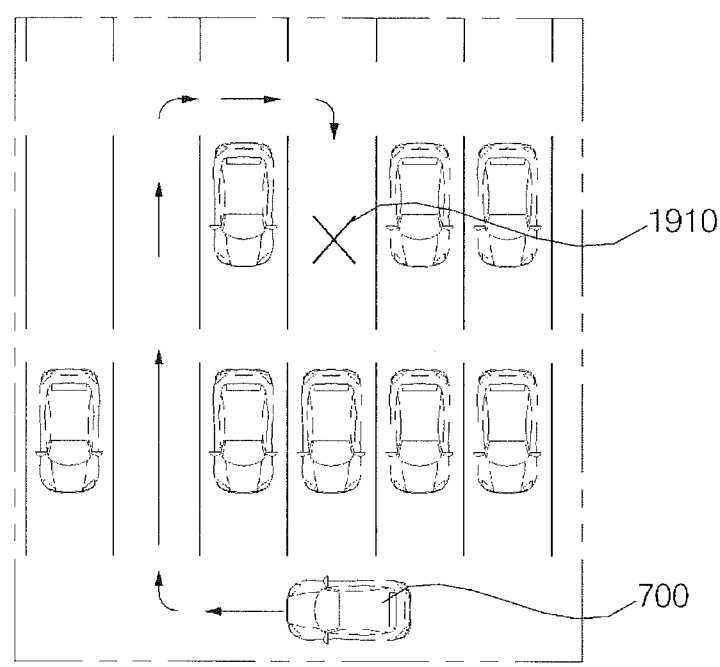
FIG. 19 is a diagram illustrating an example of moving a parked vehicle and parking the moved vehicle according to preset reservation after parking.

FIGS. 18 and 19 are views for explaining operation of moving the parked vehicle after completion of parking according to an implementation.

Referring to FIG. 18, the processor 170 may set a parking position according to user input. For example, the processor 170 may receive the user input and set reserved parking 1811, alarm 1812, shade parking 1813, parking on a rainy day 1814, parking on a snowy day 1815 and indoor parking 1816.

Reserved parking 1811 may be an item for setting parking at a reserved position according to user input.

The alarm 1812 may be an item for setting user alarm which is output when a parking related event is generated.

Shade parking 1813 may be an item for setting parking at a shaded position.

Parking on a rainy day 1814 may be an item for setting parking when it is raining.

Parking on a snowy day 1815 may be an item for setting parking when it is snowing.

Indoor parking 1816 may be an item for setting indoor parking.

Referring to FIG. 19, upon completion of parking of the vehicle, the processor 170 may receive information on the surrounding environment. The processor 170 may receive information sensed by the sensing unit 760 of the vehicle or information acquired through the communication unit 710. For example, the processor 170 may receive information about rainfall change, snowfall change, change of the intensity of sunlight radiated to the vehicle and the like.

When the surrounding environment changes while the vehicle is parked, the processor 170 may provide a signal for controlling the parked vehicle to be moved and parked in response to surrounding environment change. The surrounding environment change may be rainfall change, snowfall change, or change of the intensity of sunlight radiated to the vehicle.

For example, the processor 170 may preset parking on a rainy day 1814 or parking on a snowy day 1815 according to user input, as described above with reference to FIG. 18. When it is raining or snowing with the vehicle parked in an outdoor parking lot, the processor 170 may provide a control signal for moving the parked vehicle to an indoor parking lot and parking the vehicle therein. Alternatively, the processor 170 may provide a control signal for moving the parked vehicle to a parking space near the driver and parking the vehicle therein. Here, the processor 170 may receive information on the position of the mobile terminal 600 carried by the driver through the communication unit 120. The processor 170 may detect the position of the driver from images acquired through the cameras 195.

For example, the processor 170 may set shade-parking 1813 according to user input, as described above with reference to FIG. 18. When the intensity of sunlight radiated to the vehicle exceeds a reference value with the vehicle parked in an outdoor parking lot, the processor 170 may provide a control signal for moving the parked vehicle to an indoor parking lot and parking the vehicle therein. Alternatively, the processor 170 may provide a control signal for moving the parked vehicle to a shaded parking space parking the vehicle therein.

For example, the processor 170 may set reserved parking 1811, as described above with reference to FIG. 18. The processor 170 may set a predetermined parking space as a reserved parking space according to user input.

When another vehicle has been parked in the parking space set as the reserved parking space, the vehicle 700 can be temporarily parked in another parking space. When the other vehicle leaves the reserved parking space, the processor 170 may provide a control signal for moving the parked vehicle 700 to the reserved parking space and parking the vehicle 700 therein. For example, when another vehicle parked in the reserved parking space is not detected, the processor 170 may provide a control signal for moving the parked vehicle 700 to the reserved parking space and parking the vehicle 700 therein.

As another example, the vehicle 700 may be double-parked since there is no parking space in a parking lot. In this case, the processor 170 may set reserved parking 1811 according to user input. A reserved parking space may be any parking space in the parking lot. When another vehicle parked in a first parking space leaves, the processor 170 may provide a parking control signal for parking the vehicle 700 in the first parking space.

Figure 20:
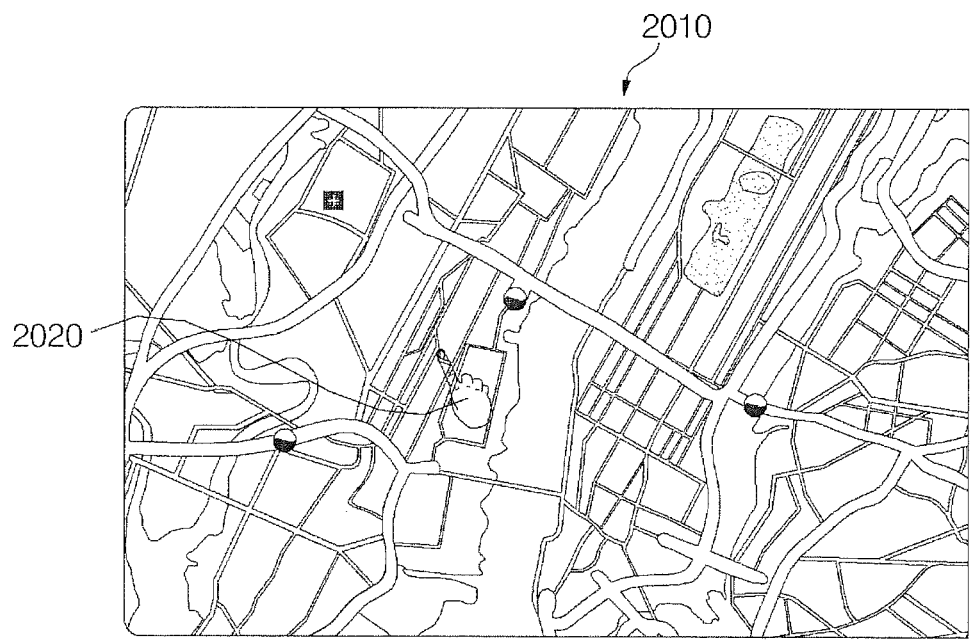
FIG. 20 is a diagram illustrating an example of parking a vehicle according to user input applied through a map displayed on a display.

FIG. 20 is a view for explaining operation of parking the vehicle according to user input applied through a map displayed on the display according to an implementation.

Referring to FIG. 20, the apparatus 100 for parking a vehicle may include the display 180 and the processor 170. The display 180 may display a map 2010. The display 180 may receive the first user input applied to the map displayed thereon. The first user input may be a parking command.

The processor 170 may provide a parking control signal for parking the vehicle in a real space corresponding to a point on the map 2010, which corresponds to the first user input, according to the first user input.

Specifically, when touch input of the user is applied to a predetermined region of the map 2010, the processor 170 may provide a control signal for moving the vehicle 700 to an area corresponding to the touched region. After the vehicle is moved, the processor 170 may search surroundings of the vehicle, detect a parking space and provide a control signal for parking the vehicle in the detected parking space.

When the vehicle 700 is an autonomous vehicle, it is desirable to perform parking described with reference to FIG. 20.

Implementations described herein may be implemented as code that may be written to a computer-readable recording medium and may thus be read by a computer. The computer-readable recording medium may be any type of recording device in which data may be stored in a computer-readable manner. Examples of the computer-readable recording medium include a HDD (Hard Disk Drive), a SSD (Solid State Disc), SDD (Silicon Disc Drive), a ROM, a RAM, a CD-ROM, a magnetic tape, a floppy disk, optical data storage, and a carrier wave, e.g., data transmission over the Internet. The computer may include the processor 170 or the controller 770. Although the examples above have been disclosed for illustrative purposes, those skilled in the art will appreciate that various modifications, additions and substitutions are possible, without departing from the scope and spirit of the invention as disclosed in the accompanying claims.

What is claimed is:

1. An apparatus configured to park a vehicle comprises:
a plurality of cameras configured to acquire images of surroundings of the vehicle;
a display configured to display an around-view image showing a view around the vehicle that is generated by combining the images acquired by the plurality of cameras; and
a processor configured to:
determine a first input that is applied on the around-view image displayed on the display;
display, according to the first input that has been applied on the around-view image, a parking guide image representing a user-specified parking region for the vehicle;
determine whether there is an actual parking region that matches the displayed parking guide image representing the user-specified parking region; and
based on a determination that there is an actual parking region that matches the displayed parking guide image, provide a signal that controls a parking operation of the vehicle,
wherein the processor is further configured to:
determine that a second input is applied on the around-view image displayed on the display; and
based on the second input being applied on the around-view image, control a position, a size, a direction, or a shape of the parking guide image displayed on the around-view image.

2. The apparatus of claim 1, wherein the first input is a touch-and-drag input received through the display while the around-view image is displayed.

3. The apparatus of claim 2, wherein the touch-and-drag input comprises a drag input starting from a touched first point on the around-view image and extending to a second point having a horizontal axis and a vertical axis that are different from the first point,
wherein the parking guide image has a rectangular shape and comprises a diagonal line connecting the first point and the second point.

4. The apparatus of claim 3, wherein the processor is configured to provide the signal that controls the parking operation the vehicle such that a front side of the vehicle is parked at a location corresponding to the first point of the touch-and-drag input and a rear side of the vehicle is parked at a location corresponding to the second point of the touch-and-drag input.

5. The apparatus of claim 1, wherein the processor is further configured to:
based on the determination that there is an actual parking region that matches the displayed parking guide image, control a parking availability notice to be output through the display.

6. The apparatus of claim 1, wherein the processor is further configured to:
based on a determination that there is not an actual parking region that matches the displayed parking guide image, control a parking unavailability notice to be output.

7. The apparatus of claim 6, wherein the processor is further configured to:
based on the determination that there is not an actual parking region that matches the displayed parking guide image, control a recommended parking space to be displayed on the display.

8. The apparatus of claim 7, wherein the processor is configured to control the recommended parking space to be displayed on the display by:
determining at least one available parking space;
determining, from among the at least one available parking space, a parking space having a largest region overlapping with the parking guide image; and
display the parking space having the largest region overlapping with the parking guide image as the recommended parking space.

9. The apparatus of claim 8, wherein the processor is further configured to:
determine that a third input is applied to the display; and
based on the determination that the third input has been applied, provide the signal that controls the parking operation of the vehicle such that the vehicle is parked in the recommended parking space.

10. The apparatus of claim 2, wherein the processor is further configured to:
determine that the first input is a long touch input received through the display while the around-view image is displayed;
determine a duration of the long touch input; and
control a size of the parking guide image to be changed in proportion to the duration of the long touch input.

11. The apparatus of claim 2, wherein the processor is configured to determine the first input by:
determining a position and a posture of a mobile terminal that is in contact with or in proximity to the display while the around-view image is displayed; and
determining the first input based on the position and the posture of the mobile terminal.

12. The apparatus of claim 11, further comprising a communication unit configured to exchange data with the mobile terminal,
wherein the processor is further configured to:
receive information regarding the position and the posture of the mobile terminal through the communication unit; and
control the parking guide image to be displayed on the display according to the information regarding the position and the posture of the mobile terminal.

13. The apparatus of claim 12, wherein the processor is configured to control the displayed parking guide image to be changed according to a change in at least one of the position or the posture of the mobile terminal.

14. The apparatus of claim 1, wherein the processor is configured to:
determine a recommended parking space according to at least one of a parking history, a detected surrounding environment, or a detected object; and
control the display to display, on the around-view image, the recommended parking space.

15. The apparatus of claim 1, wherein the processor is further configured to:
detect at least one object located near the parking region;
determine at least one distance between the at least one object and an estimated parked state of the vehicle in the parking region; and
control the display to display an indication of the at least one distance between the at least one object and the estimated parking state of the vehicle in the parking region.

16. The apparatus of claim 15, wherein the processor is configured to provide the signal that controls the parking operation of the vehicle such that a distance between the at least one object and a driver-side door of the vehicle exceeds a threshold.

17. The apparatus of claim 1, wherein the processor is further configured to:
- detect a change in a surrounding environment of the vehicle while the vehicle is in a parked state; and
- based on the detection of the change in the surrounding environment while the vehicle is in the parked state, provide a second signal that controls the vehicle to move and perform a second parking operation based on the change in the surrounding environment.

18. The apparatus of claim 17, wherein the processor is configured to detect the change in the surrounding environment by detecting a change in a rainfall, a snowfall, or an intensity of sunlight radiated on the vehicle.

19. The apparatus of claim 1, wherein the processor is further configured to:
- determine that a second parking region is available while the vehicle is in a parked state; and
- based on the determination that the second parking region is available while the vehicle is in a parked state, provide a second signal controls the vehicle to move and perform a second parking operation into the second parking region.

* * * * *